(12) United States Patent  
Sada et al.

(10) Patent No.: US 8,970,070 B2  
(45) Date of Patent: Mar. 3, 2015

(54) WIRELESS POWER TRANSMISSION SYSTEM

(75) Inventors: Tomokazu Sada, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 713 days.

(21) Appl. No.: 13/170,355

(22) Filed: Jun. 28, 2011

(65) Prior Publication Data

US 2012/0001497 A1  Jan. 5, 2012

Related U.S. Application Data

(60) Provisional application No. 61/360,978, filed on Jul. 2, 2010.

(51) Int. Cl.
| | | |
|---|---|---|
| H01F 27/42 | (2006.01) | |
| H02J 5/00 | (2006.01) | |
| H02J 7/02 | (2006.01) | |

(52) U.S. Cl.  
CPC ....... *H02J 5/005* (2013.01); *H02J 7/025* (2013.01)  
USPC ............. 307/104; 307/140; 307/149; 307/82; 307/86; 455/272; 455/453; 375/267; 375/260

(58) Field of Classification Search  
USPC .................. 307/104, 140, 110; 320/108, 106; 333/219  
See application file for complete search history.

(56) References Cited

U.S. PATENT DOCUMENTS

| | | | |
|---|---|---|---|
| 8,299,652 B2 * | 10/2012 | Sample et al. ................ | 307/104 |
| 2006/0202665 A1 | 9/2006 | Hsu | |
| 2008/0278264 A1 | 11/2008 | Karalis et al. | |
| 2009/0243397 A1 | 10/2009 | Cook et al. | |
| 2009/0271048 A1 | 10/2009 | Wakamatsu | |
| 2010/0164296 A1 | 7/2010 | Kurs et al. | |

(Continued)

FOREIGN PATENT DOCUMENTS

| | | |
|---|---|---|
| CN | 101471587 A | 9/2011 |
| JP | 4318742 | 6/2009 |

(Continued)

OTHER PUBLICATIONS

International Search Report, corresponding International Application PCT/JP2011/003696, issued Oct. 11, 2011, Japanese language.

(Continued)

*Primary Examiner* — Rexford Barnie  
*Assistant Examiner* — Jagdeep Dhillon  
(74) *Attorney, Agent, or Firm* — Renner, Otto, Boisselle & Sklar, LLP

(57) ABSTRACT

A wireless power transmission unit according to the present invention transmits power wirelessly from a power transmitting section 100 to a power receiving section 200 through a resonant magnetic field. The unit includes: the power transmitting section 100, which resonates at a resonant frequency f0; at least one relay section 300, which can resonate at a frequency that is selected from multiple frequencies including the resonant frequency f0; and a resonance control section 600 that outputs information that specifies a resonance condition to be imposed on the relay section 300 according to the arrangement of the power receiving section 200 and that makes the relay section 300 resonate on the resonance condition that has been specified in accordance with that information.

19 Claims, 24 Drawing Sheets

(56) References Cited

U.S. PATENT DOCUMENTS

| | | | |
|---|---|---|---|
| 2010/0201203 A1* | 8/2010 | Schatz et al. ................. | 307/104 |
| 2010/0264747 A1* | 10/2010 | Hall et al. .................... | 307/104 |
| 2011/0101788 A1* | 5/2011 | Sun et al. ..................... | 307/104 |
| 2011/0175455 A1 | 7/2011 | Hashiguchi | |
| 2011/0210621 A1 | 9/2011 | Iwaisako et al. | |

FOREIGN PATENT DOCUMENTS

| | | |
|---|---|---|
| JP | 2009-268311 A | 11/2009 |
| JP | 2010-124545 | 6/2010 |
| JP | 2010-148273 A | 7/2010 |
| JP | 2011-147280 A | 7/2011 |
| JP | 2011-151989 A | 8/2011 |
| WO | WO 2008/050260 A1 | 5/2008 |
| WO | WO 2008/137996 A1 | 11/2008 |
| WO | 2009/111597 A2 | 9/2009 |

OTHER PUBLICATIONS

Chinese Search Report for corresponding Chinese Application No. 201180003066.0 with English translation thereof, mailed Nov. 1, 2013.

Kurakake et al., "Magic Surfaces: A Smart Building Material for Indoor Sensing Infrastructures", Networked Sensing Systems, INNS '07, Fourth International Conference ON, IEEE, PI, Jun. 1, 2007, pp. 213-220.

Extended European Search Report for European Application No. 11800429.0 issued on Nov. 28, 2013.

Notice of Reasons for Rejection corresponding Japanese Application No. 2012-505537 issued May 8, 2012 and partial English translation.

* cited by examiner

WIRELESS POWER TRANSMISSION SYSTEM

This application claims priority under 35 USC §119(e) to U.S. Provisional Application No. 61/360,978 filed on Jul. 2, 2010, the entire contents of which are incorporated herein by reference.

BACKGROUND OF THE INVENTION

1. Field of the Invention

The present invention relates to a wireless power transmission unit that can transfer energy from a power transmitting section to a power receiving section by a non-contact method. The present invention also relates to a device including a power receiving section to be used in combination with such a wireless power transmission unit and to a wireless power transmission system.

2. Description of the Related Art

Currently, power is supplied to various electronic devices ordinarily via wires (or cables). Such a wired power supply is advantageous in terms of power supply stability and safety precautions against electric shock because electric power is supplied while being confined in the wire. However, if an electronic device is connected to an AC outlet with a wire, then the portability of that device is much limited. On top of that, wired power transmission not just would give an untidy appearance but also could catch someone or something with the wire and make him, her or it stumble on it. Furthermore, since the AC outlet and the end of the wire are connected together via metallic contacts, those contacts should always be kept waterproof and dustproof as well.

Thus, to overcome with these issues with the wired power transmission, more and more people are paying increasing attention to wireless power transmission for supplying power to various electronic devices by a non-contact method. As methods for realizing such wireless power transmission, a conventional electromagnetic induction method can naturally be used. But a method that uses resonant magnetic coupling has also been proposed in United States Patent Application Laid-Open Publication No. 2008/0278264-A1 (see FIGS. 6 and 11, in particular), which will be referred to herein as "Patent Document No. 1" for convenience sake. According to the resonant magnetic coupling method, resonant mode coupling between resonant antennas is used to realize longer-range and higher-efficiency power transfer than the conventional electromagnetic induction method. They believe that particularly if a resonant magnetic field is used, influence on surrounding organisms would be reduced compared to a situation where a resonant electric field is used.

Japanese Patent No. 4318742 (which will be referred to herein as "Patent Document No. 2" for convenience sake) discloses an exemplary application of a wireless power transmission unit that uses the resonant magnetic coupling. According to Patent Document No. 2, a tertiary coil is provided between a primary coil for transmitting power and a secondary coil for receiving the power, thereby transmitting a huge amount of power to the secondary coil with even more efficiency. That is to say, the tertiary coil "relays" the power between the primary and secondary coils. If the distance between the power transmitting resonator (or coil) and the power receiving resonator (or coil) is substantially fixed in this manner, the power transfer efficiency can be maximized just by choosing the best installation position for the relay resonator and the best resonant frequency.

In a wireless power transmission unit with a relay resonator such as the one disclosed in Patent Document No. 2, however, the position of the resonator that receives the power wirelessly (i.e., the power receiving resonator) should be substantially fixed.

It is therefore an object of the present invention to provide a wireless power transmission unit in which the position of the device that receives the power being transmitted can be determined more flexibly.

SUMMARY OF THE INVENTION

A wireless power transmission unit according to the present invention transmits power wirelessly from a power transmitting section to a power receiving section through a resonant magnetic field. The unit includes: the power transmitting section, which resonates at a resonant frequency f0; at least one relay section, which is able to resonate at a frequency that is selected from multiple frequencies including the resonant frequency f0; and a resonance control section for outputting resonance condition information that specifies a resonance condition to be imposed on the relay section according to the arrangement of the power receiving section and for controlling the resonance condition imposed on the relay section in accordance with the resonance condition information.

In one preferred embodiment, the at least one relay section includes first through $n^{th}$ relay sections (where n is an integer that is equal to or greater than two) that are able to resonate at a frequency that is selected from multiple frequencies including the resonant frequency f0. And the resonance control section outputs resonance condition information that specifies resonance conditions to be imposed on the first through $n^{th}$ relay sections according to the arrangement of the power receiving section and controls the resonance conditions imposed on the respective relay sections in accordance with the resonance condition information.

In another preferred embodiment, the wireless power transmission unit includes a telecommunications system for conveying the resonance condition information from the resonance control section to the relay section(s).

In still another preferred embodiment, the wireless power transmission unit includes a position detecting section for detecting the position of the power receiving section and outputting the power receiving section's position information.

In this particular preferred embodiment, the power receiving section's position information is information about the position of a power receiving resonator included in the power receiving section.

In yet another preferred embodiment, the relay section includes a relay resonator, which resonates at the resonant frequency f0, and a resonance adjustment circuit, which receives the resonance condition information from the resonance control section and which adjusts the resonance condition imposed on the relay resonator according to the resonance condition information.

In yet another preferred embodiment, each of the resonance control section and the relay section includes a telecommunications section, and the relay section receives the resonance condition information from the resonance control section by way of the telecommunications sections.

In this particular preferred embodiment, the position detecting section is provided for the relay section, and the telecommunications section of the relay section conveys the power receiving section's position information, which has been provided by the position detecting section, to the telecommunications section of the resonance control section.

In yet another preferred embodiment, each of the resonance control section and the position detecting section includes a telecommunications section, and the telecommunications section of the position detecting section conveys the power receiving section's position information to the telecommunications section of the resonance control section.

In yet another preferred embodiment, the resonance control section selects one of the relay sections, which is prevented from resonating at the resonant frequency f0, by reference to the power receiving section's position information, and outputs the resonance condition information based on a result of the selection.

In yet another preferred embodiment, the resonance control section prevents at least one of the relay sections, except the relay section that is located closest to the power receiving section, from resonating at the resonant frequency f0.

In yet another preferred embodiment, if the power receiving section is located close to the power transmitting section, the resonance control section prevents one of the relay sections that is located closer to the power transmitting section than any other relay section from resonating at the resonant frequency f0.

In yet another preferred embodiment, if the power receiving section is located between two adjacent ones of the relay sections, the resonance control section makes at least one of the relay sections that is located between the power transmitting section and the power receiving section resonate at the resonant frequency f0.

In yet another preferred embodiment, if power is directly transmissible from the power transmitting section to the power receiving section, the resonance control section prevents every one of the relay sections, which is located between the power transmitting section and the power receiving section, from resonating at the resonant frequency f0.

In yet another preferred embodiment, if power is directly transmissible from the power transmitting section to the power receiving section, the resonance control section prevents one of the relay sections, which is located closer to the power receiving section than any other relay section, from resonating at the resonant frequency f0.

In yet another preferred embodiment, the power transmitting section includes a resonance signal generating section for generating a resonance signal with the resonant frequency f0, and a power transmitting resonator for generating a resonant magnetic field based on the resonance signal.

In this particular preferred embodiment, the power transmitting section further includes a resonance adjustment circuit for changing the resonant frequency of the power transmitting resonator.

In a specific preferred embodiment, the power transmitting section and the relay section are at least partially embedded in a wall, a floor or a ceiling of a building.

A device according to the present invention is a device including a power receiving section to be used in combination with a wireless power transmission unit according to any of the preferred embodiments of the present invention described above. The power receiving section includes a power receiving resonator, which resonates at the resonant frequency f0, thereby receiving energy from either the power transmitting section or the relay section of the wireless power transmission unit, and an output converting section for converting the energy into electric power energy.

In one preferred embodiment, the power receiving section includes a telecommunications section, which is able to receive resonance condition information from the resonance control section, and a resonance adjustment circuit for controlling the power receiving resonator in accordance with the resonance condition information.

In this particular preferred embodiment, the power receiving section includes a position detecting section for detecting the position of the power receiving section and outputting position information that has been obtained based on a result of the detection, and the position information is conveyed by the telecommunications section to the resonance control section.

A wireless power transmission system according to the present invention includes: a power transmitting section, which resonates at a resonant frequency f0; at least one relay section, which is able to resonate at a frequency that is selected from multiple frequencies including the resonant frequency f0; at least one power receiving section, which resonates at the resonant frequency f0; and a resonance control section for outputting resonance condition information that specifies a resonance condition to be imposed on the relay section according to the arrangement of the power receiving section and for controlling the resonance condition imposed on the relay section in accordance with the resonance condition information.

In one preferred embodiment, the at least one power receiving section includes multiple power receiving sections, which are able to resonate at frequencies that are selected from multiple frequencies including the resonant frequency f0. The resonance control section outputs resonance condition information that specifies resonance conditions to be imposed on the relay section and the multiple power receiving sections according to the arrangement of the power receiving sections, controls the resonance conditions imposed on the relay section and the power receiving sections in accordance with the resonance condition information, and supplies power to the power receiving sections time-sequentially.

In another preferred embodiment, the power transmitting section includes multiple power transmitting resonators, which are arranged so as to cross each other at right angles.

In this particular preferred embodiment, the wireless power transmission system includes a direction detecting section for detecting the direction of a power receiving resonator that is included in the power receiving section and outputting direction information based on a result of the detection. The power transmitting section makes one of the multiple power transmitting resonators, which has been selected based on the direction information, resonate at the resonant frequency f0.

In a wireless power transmission unit and system according to the present invention, power can be transmitted wirelessly to a power receiving section in a broader range. In addition, according to the present invention, power can be transmitted efficiently according to the arrangement of the power receiving section.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First of all, a fundamental arrangement for a wireless power transmission system according to the present invention will be described with reference to FIGS. 1A and 1B, each of which is a block diagram illustrating an exemplary configuration for a wireless power transmission unit 1 according to the present invention and a power receiving section (or receiver) 200 that is supplied with electric power by the wireless power transmission unit 1. Even though the power receiving section 200 is arranged at two different positions in FIGS. 1A and 1B, the wireless power transmission unit 1 itself has the same configuration in these two examples.

Figure 1B:
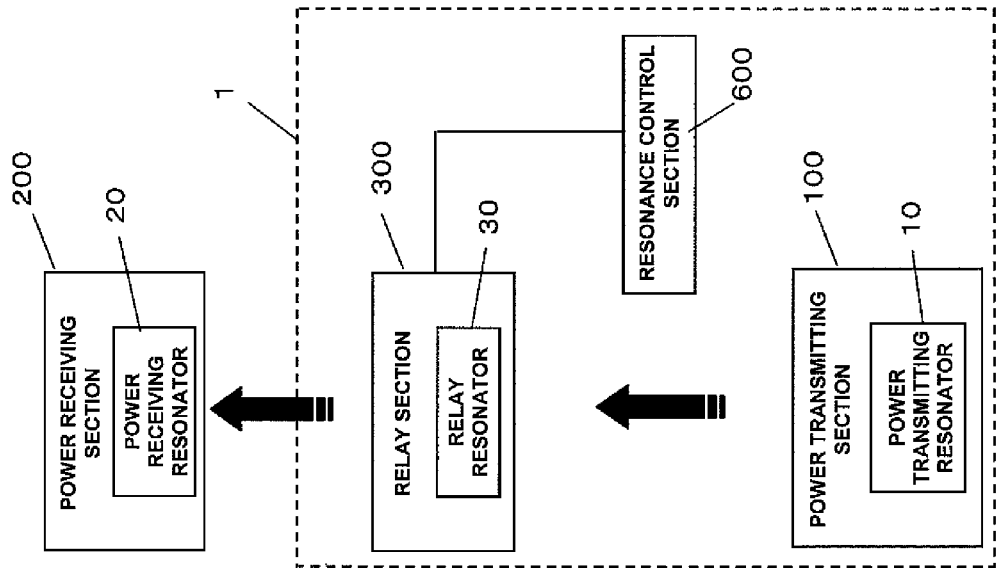
FIG. 1B illustrates another wireless power transmission system according to the present invention, of which the power receiving section 200 is arranged at a different position.
Figure 1A:
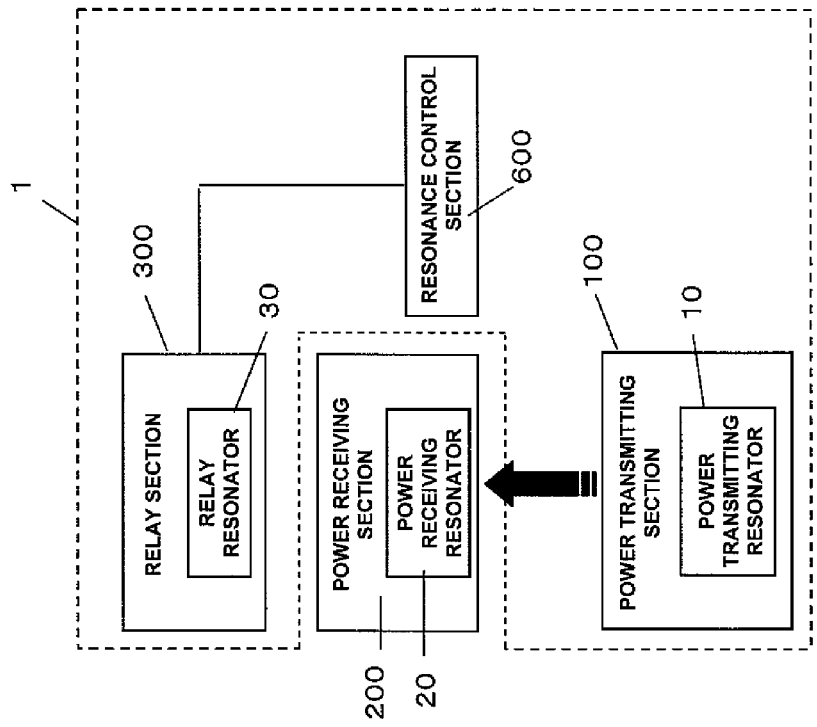
FIG. 1A illustrates a wireless power transmission system according to the present invention.

Specifically, in the examples illustrated in FIGS. 1A and 1B, the wireless power transmission unit 1 includes a power transmitting section 100 that resonates at a resonant frequency f0, a relay section 300 that can resonate at one of multiple frequencies including the resonant frequency f0, and a resonance control section 600 for controlling the resonance condition imposed on the relay section 300.

The power receiving section 200 is a target device to which the wireless power transmission unit 1 needs to supply electric power. And a wireless power transmission system is formed as a combination of the power receiving section 200 and the wireless power transmission unit 1. The position of the power receiving section 200 may change as shown in FIGS. 1A and 1B. The power receiving section 200 is typically a desktop or laptop computer or any other kind of office equipment, a wall-mounted TV monitor, a mobile AV device or any other kind of audiovisual equipment, or a hearing aid or any other piece of healthcare equipment. The power receiving section 200 can also be an electric car, an electric motorcycle, a robot, a solar cell or a fuel cell as well. It should be noted that the number of power receiving section 200 that can receive electric power from the single wireless power transmission unit 1 is not always one.

Each of the power transmitting section 100, the relay section 300 and the power receiving section 200 includes a resonator (e.g., an antenna). And those antennas can be coupled together through a resonant magnetic field. Those three resonators that the power transmitting section 100, the relay section 300 and the power receiving section 200 have will be referred to herein as a "power transmitting resonator 10", a "relay resonator 30" and a "power receiving resonator 20", respectively. Each of these resonators 10, 20 and 30 is implemented as a resonant circuit in which an inductor and a capacitor are connected together either in series or in parallel.

In this description, when we say the "power transmitting section 100 resonates", it means herein that the power transmitting resonator 10 of the power transmitting section 100 resonates. Likewise, when we say the "relay section 300 resonates", it means herein that the relay resonator 30 of the relay section 30 resonates. And when we say the "power receiving section 200 resonates", it means herein that the power receiving resonator 20 of the power receiving section 200 resonates.

Figure 1D:
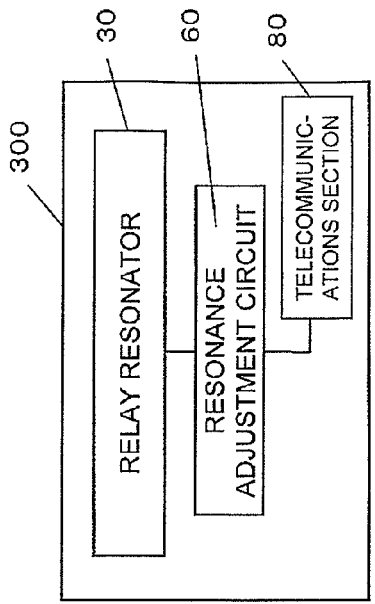
FIG. 1D illustrates a basic configuration for a relay section 300 that the wireless power transmission unit of the present invention has.
Figure 1F:
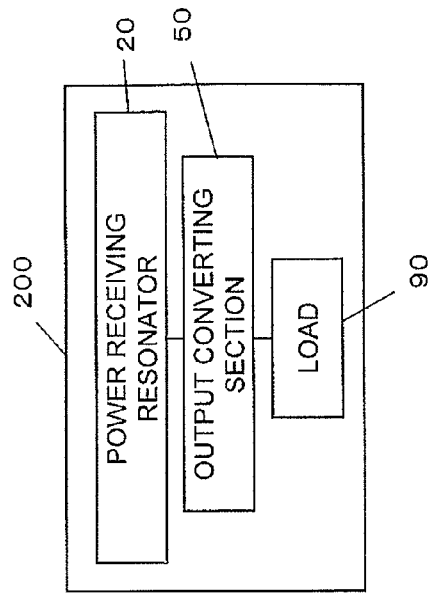
FIG. 1F illustrates a basic configuration for a power receiving section 200 to be supplied with power by the wireless power transmission unit of the present invention.
Figure 1C:
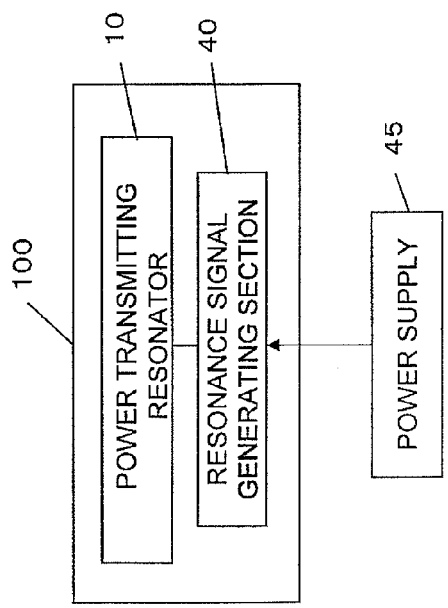
FIG. 1C illustrates a basic configuration for a power transmitting section 100 that a wireless power transmission unit according to the present invention has.

FIG. 1C illustrates a basic configuration for the power transmitting section 100. As shown in FIG. 1C, the power transmitting section 100 includes a power transmitting resonator 10 that functions as a power transmitting antenna and a resonance signal generating section 40 for supplying RF energy to the power transmitting resonator 10. The resonance signal generating section 40 receives DC or AC energy from an external power supply 45 and outputs RF energy with a frequency fc (=f0). The power transmitting resonator 10 distributes magnetic field energy with the frequency f0 in the surrounding space, thereby generating a resonant magnetic field, which oscillates at the frequency f0, around the power transmitting resonator 10.

Figure 1E:
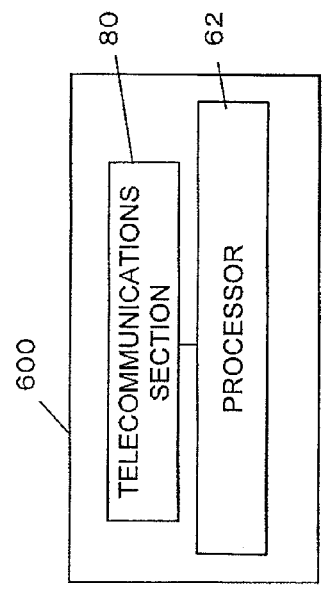
FIG. 1E illustrates a basic configuration for a resonance control section 600 that the wireless power transmission unit of the present invention has.

FIG. 1D illustrates a basic configuration for the relay section 300. As shown in FIG. 1D, the relay section 300 includes a relay resonator 30 that functions as a relay antenna, a resonance adjustment circuit 60 that can change the resonant frequency of the relay section 300, and a telecommunications section 80 that receives a signal from the resonance control section 600 (see FIGS. 1A and 1B). Thanks to the action of the resonance adjustment circuit 60, this relay section 300 functions as a variable resonator. An exemplary configuration for the resonance adjustment circuit 60 will be described later. A signal may be transmitted either through a wire or wirelessly by way of the telecommunications section 80. FIG. 1E illustrates a basic configuration for the resonance control section 600. As shown in FIG. 1E, the resonance control section 600 includes a processor 62 that determines information that specifies a resonance condition to be imposed on the relay section 300 (which will be referred to herein as "resonance condition information") according to the arrangement of the power receiving section 200 and a telecommunications section 80 for transmitting the resonance condition information to the relay section 300. The resonance control section 600 provides resonance condition information for the relay section 300 according to the arrangement of the power receiving section 200 and makes the relay section 300 resonate under the resonance condition that has been set in accordance with that information. That is to say, the resonant frequency of the relay section 300 is switched between f0 and a non-f0 value in accordance with the resonance condition information that has been received from the resonance control section 600. The core of the resonance control section 600 may be a general-purpose computer or controller, in which a program for controlling the resonance state of the relay resonator 30 has been installed, but may also be a dedicated piece of hardware as well.

FIG. 1F illustrates a basic configuration for the power receiving section 200. As shown in FIG. 1F, the power receiving section 200 includes a power receiving resonator 20 that functions as a power receiving antenna, an output converting section 50 that is connected to the power receiving resonator 20, and a load 90 that is connected to the output converting section 50. The power receiving resonator 20 couples with the resonant magnetic field with the resonant frequency f0, which has been generated by the wireless power transmission unit 1, and therefore, can receive energy from the wireless power transmission unit 1. The load 90 is a circuit that consumes the energy that has been received by the power receiving resonator 20 through the resonant magnetic field. And any of various loads may be used according to the type of the power receiving section 200. The output converting section 50 converts the energy that the power receiving resonator 20 has obtained into either DC power, of which the voltage is as high as the one required by the load 90, or AC power, of which the frequency and voltage are as high as the ones required by the load 90.

Next, it will be described how the resonance condition imposed on the relay section 300 is changed depending on whether the power receiving section 200 is present at the position shown in FIG. 1A or at the one shown in FIG. 1B.

If the power receiving section 200 is located close to the relay section 300 and distant from the power transmitting section 100 as shown in FIG. 1A, the resonance control section 600 sets the resonant frequency of the relay section 300 to be f0, thereby coupling the relay section 300 with the resonant magnetic field with the frequency f0. In this manner, power can be transmitted wirelessly from the power transmitting section 100 to the power receiving section 200 at a distant position by way of the relay section 300.

On the other hand, if the power receiving section 200 is located close to the power transmitting section 100 as shown in FIG. 1B, then power can be transmitted directly from the power transmitting section 100 to the power receiving section 200. That is why the resonance control section 600 changes the resonant frequency of the relay section 300 into a non-f0 value. Then, the relay section 300 is no longer coupled with the resonant magnetic field with the frequency f0. As a result, the transmission loss of the energy, which would be caused if the power being transmitted from the power transmitting section 100 to the power receiving section 200 passed through the relay section 300 in vain, can be avoided.

In this manner, in the wireless power transmission unit 1, the resonance control section 600 changes the resonance condition imposed on the relay section 300 according to the arrangement of the power receiving section 200. As a result, energy can be transferred most efficiently by choosing the best transmission path according to the arrangement of the power receiving section 200.

It should be noted that the wireless power transmission unit 1 does not always have only one relay section 300 but may have first through $n^{th}$ relay sections 300 (where n is an integer that is equal to or greater than two) as well. Even if the wireless power transmission unit 1 has multiple relay sections 300, the most efficient transmission path can also be chosen according to the arrangement of the power receiving section 200 by avoiding coupling the relay sections 300 with the resonant magnetic field in a situation where the relay sections 300 do not have to relay the power being transmitted.

Figure 1G:
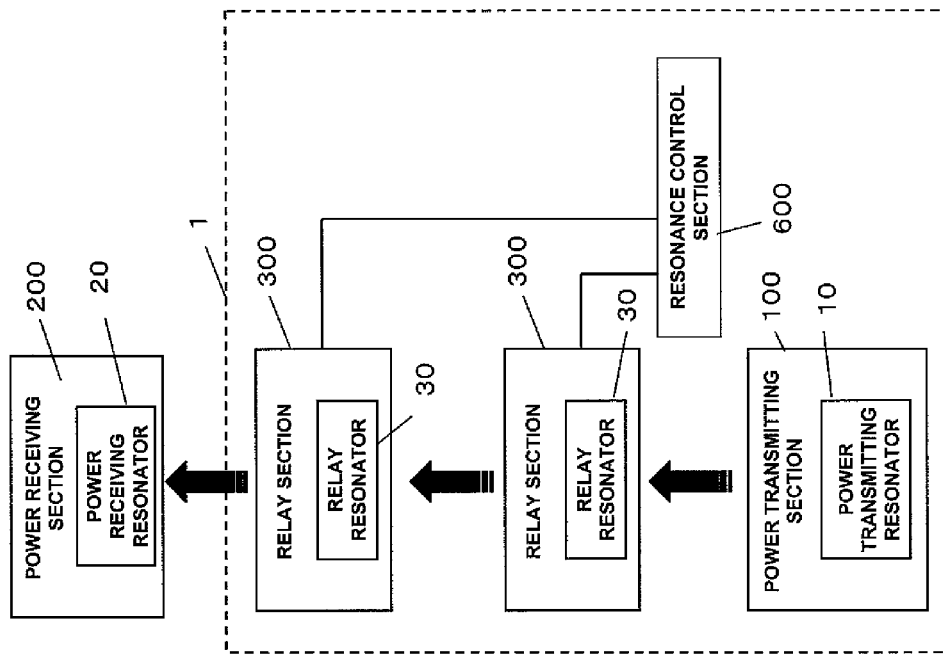
FIG. 1G illustrates a wireless power transmission system according to the present invention with multiple relay sections 300.

FIG. 1G illustrates a basic configuration for a wireless power transmission unit 1 with a number of relay sections 300. The wireless power transmission unit 1 shown in FIG. 1G has the same configuration as its counterpart 1 shown in FIGS. 1A and 1B except that this unit 1 includes multiple relay sections 300 that can resonate at a selected one of multiple frequencies including the resonant frequency f0.

If the wireless power transmission unit 1 has multiple relay sections 300, the resonance control section 600 outputs information that specifies resonance conditions to be imposed on the respective relay sections 300 (which will be referred to herein as "resonance condition information") according to the arrangement of the power receiving section 200 and makes the respective relay sections 300 resonate on the resonance conditions that have been specified by that information.

In the exemplary arrangement shown in FIG. 1G, the resonance control section 600 can determine, by the arrangement of the power receiving section 200, which relay sections 300 should be coupled with the resonant magnetic field and which relay sections 300 should not. In this manner, power can be wirelessly transmitted efficiently through only required relay sections 300 and without passing through the other unnecessary relay sections 300.

In this description, if there is only one power receiving section 200, the "arrangement of the power receiving section" means herein the position of the power receiving resonator 20 included in that power receiving section 200 (which will be referred to herein as a "power receiving position"). On the other hand, if there are multiple power receiving sections 200, then the "arrangement of the power receiving sections" means herein a set of the respective positions of the power receiving resonators 20 included in those power receiving sections 200. And the "set of the respective positions" defines the relative arrangement of those power receiving resonators.

It should be noted that the "power receiving position" provides not only information about the exact position of the power receiving resonator 20 in the three-dimensional space to be defined by XYZ coordinates but also information indicating which of the power transmitting resonator 10 and the relay resonators 30 included in the wireless power transmission unit 1 is located closest to the power receiving resonator 20. That is to say, the power receiving position related information also includes information indicating which resonator 10, 30 is located closest to the power receiving resonator 20, not just the information about the spatial coordinates of the power receiving position. Also, in this description, the "power receiving position related information" may further include various other sorts of information that can be used to determine which resonator 10, 30 is located closest to the power receiving resonator 20. Examples of those kinds of information include information about the distance from the power transmitting resonator 10 and information indicating which of multiple areas the power receiving resonator 20 is in. Such power receiving position related information may be entered by the user into the resonance control section 600. Or the wireless power transmission unit 1 may have a power receiving position detecting section for determining the power receiving position.

Embodiment 1

Hereinafter, a first preferred embodiment of a wireless power transmission unit according to the present invention will be described.

As shown in FIG. 1G, the wireless power transmission unit 1 of this preferred embodiment includes a power transmitting section 100 that resonates at a resonant frequency f0, two relay sections 300, and a resonance control section 600.

Figure 2:
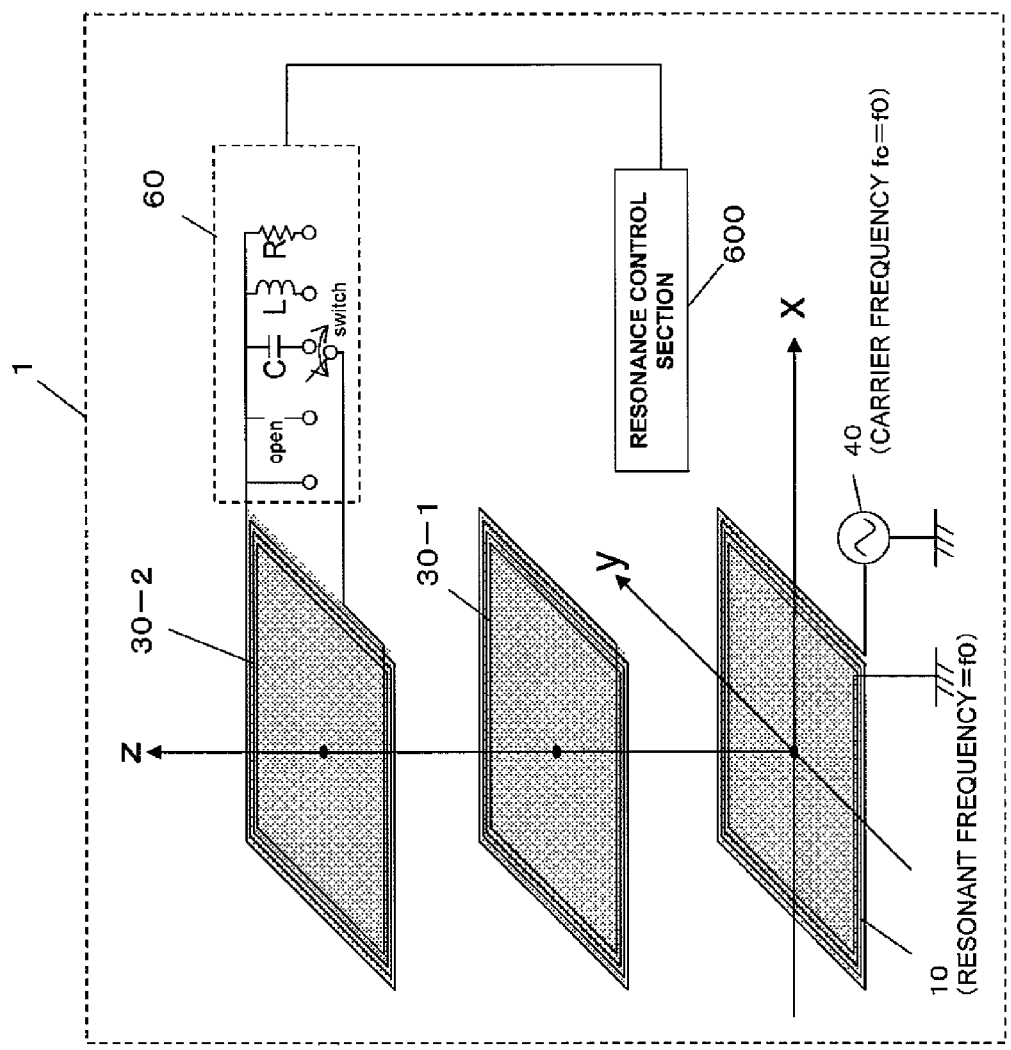
FIG. 2 illustrates an arrangement for a wireless power transmission unit 1 as a first preferred embodiment of the present invention.

Now let's look at FIG. 2, which illustrates the relative arrangement of the power transmitting resonator 10 and the relay resonators 30 in the wireless power transmission unit 1 of this preferred embodiment. In FIG. 2, these two relay resonators 30 are identified by mutually different reference numerals 30-1 and 30-2, respectively. In this description, when respective relay resonators 30 need to be mentioned on an individual basis, those resonators are identified by mutually different reference numerals such as 30-1, 30-2, and so on. When those relay resonators need to be collectively referred to, however, all of those resonators are identified simply by the reference numeral 30.

In FIG. 2, xyz coordinates (i.e., three-dimensional orthogonal coordinates) are shown to clearly represent the relative arrangement of the inductors that form respective parts of the resonators 10 and 30. Such xyz coordinates are also shown as needed on other drawings to be referred to later in this description. It should be noted that some components that will not have to be mentioned in the following description (such as the telecommunications section 80) are not shown on those drawings when it is appropriate to do that.

In the wireless power transmission unit 1 shown in FIG. 2, the resonator plane that is defined by the inductor of the power transmitting resonator 10 is parallel to the xy plane, and has its center located at the origin of the xyz coordinate system. Likewise, the resonator planes that are defined by the respective inductors of the first and second relay resonators 30-1 and 30-2 are also parallel to the xy plane and have their center located on the z-axis. Furthermore, the gaps between the power transmitting resonator 10 and the relay resonators 30-1 and 30-2 are defined so that not only the power transmitting resonator 10 and the first relay resonator 30-1 but also the first and second relay resonators 30-1 and 30-2 can be coupled together with a resonant magnetic field.

The wireless power transmission unit 1 does not always have to be installed indoors but may be installed outdoors either partially or even entirely. If the wireless power transmission unit 1 is installed indoors, the power transmitting section 100 and the relay section 300 may be at least partially embedded in a wall, a floor or a ceiling of a building. Specifically, the power transmitting resonator 10 may be embedded in the floor, for example. On the other hand, the first and second relay resonators 30-1 and 30-2 may be embedded in the four walls of a room so that their inductor wiring surrounds the interior of that room. Alternatively, the second relay resonator 30-2 may also be embedded in the ceiling. If the power transmitting resonator 10 and the relay resonators 30 are embedded in the floor, walls and/or ceiling of a room in this manner, the user can supply power to the power receiver even without noticing the presence of the wireless power transmission unit. In that case, the user is located inside of the inductors that the respective resonators 10 and 30 have. That is why the quantity of the power to be transmitted wirelessly needs to be determined carefully with the influence of the resonant magnetic field on human beings and peripheral devices well taken into consideration.

Figure 3A:
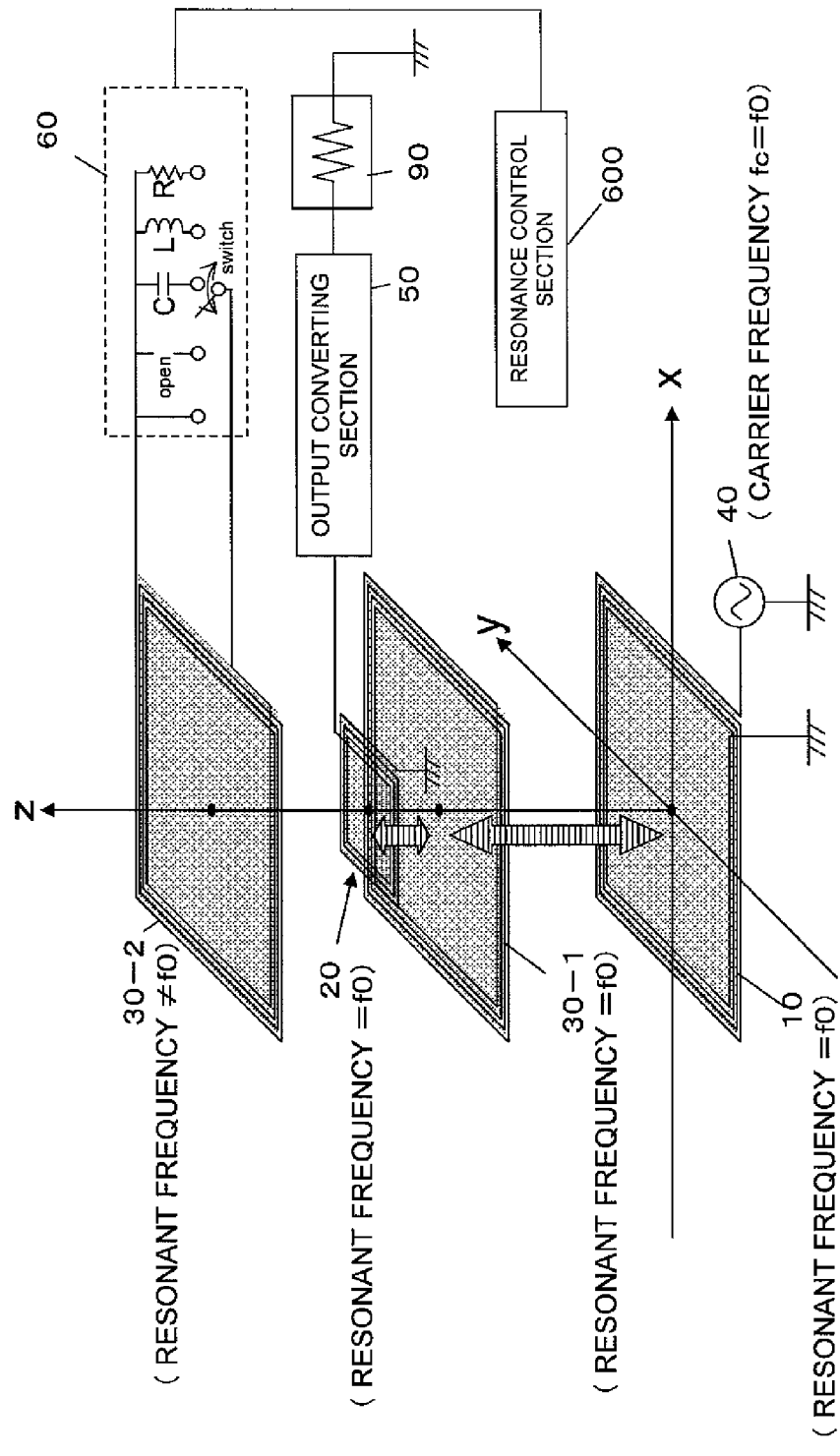
FIG. 3A, illustrates a situation where a power receiving resonator 20 is arranged close to a first relay resonator 30-1 in the wireless power transmission unit 1 of the first preferred embodiment.
Figure 3B:
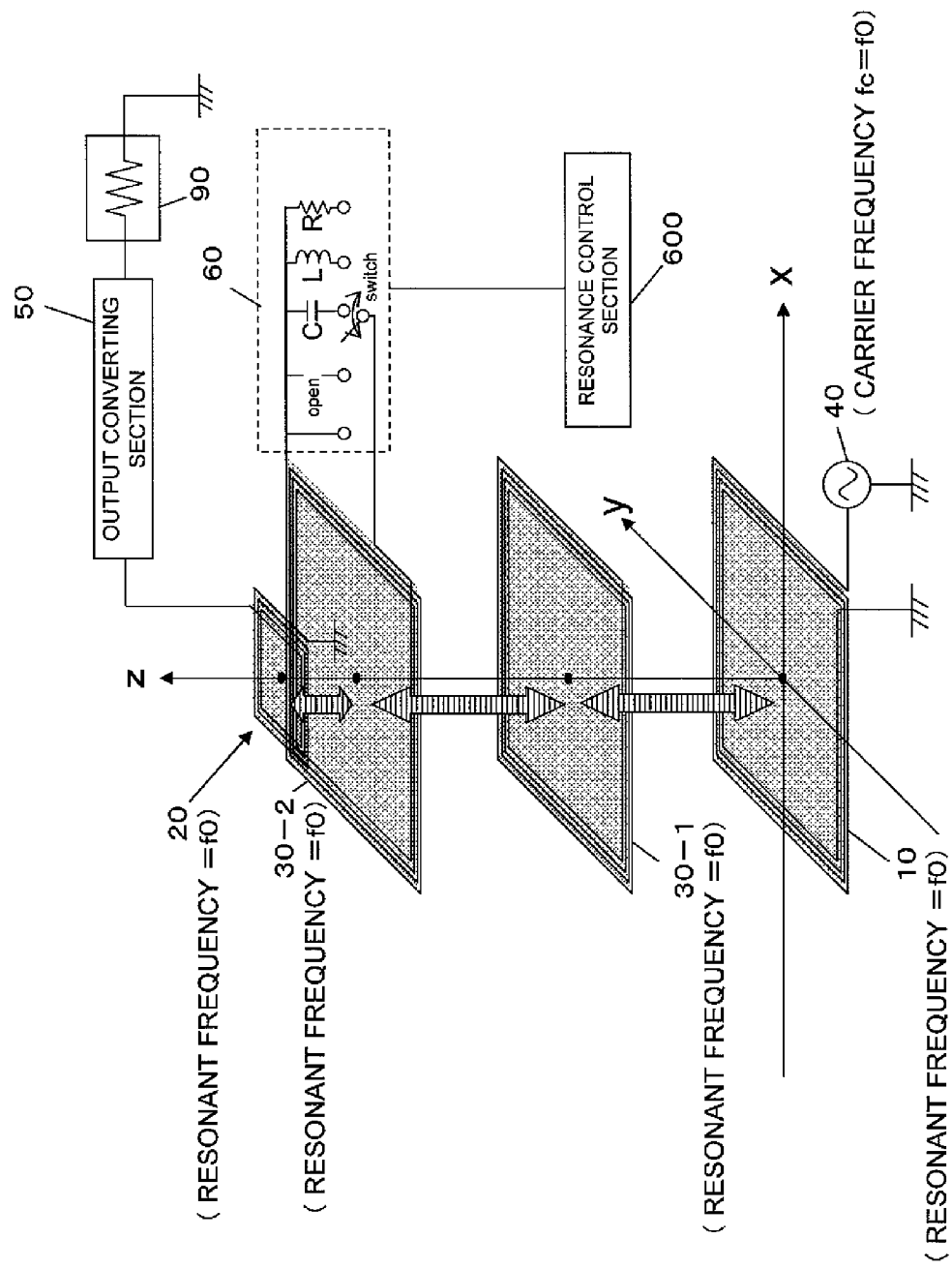
FIG. 3B illustrates a situation where the power receiving resonator 20 is arranged close to a second relay resonator 30-2 in the wireless power transmission unit 1 of the first preferred embodiment.

Let's turn to FIGS. 3A and 3B next. FIG. 3A illustrates a situation where the power receiving resonator 20 is located close to the first relay resonator 30-1 in the wireless power transmission unit of this preferred embodiment. On the other hand, FIG. 3B illustrates a situation where the power receiving resonator 20 is located close to the second relay resonator 30-2 in this wireless power transmission unit. The difference between these two situations illustrated in FIGS. 3A and 3B lies in the arrangement of the power receiving resonator 20.

In the example illustrated in FIG. 3A, the power receiving resonator 20 is located between the first and second relay resonators 30-1 and 30-2. On the other hand, in the example illustrated in FIG. 3B, the power receiving resonator 20 is located more distant from the power transmitting resonator 10 than the second relay resonator 30-2 is. In any case, the resonator to be coupled most strongly to the power receiving resonator 20 is chosen from the power transmitting resonator 10 and the relay resonators 30-1 and 30-2 according to the position of the power receiving resonator 20.

To begin with, it will be described how the wireless power transmission unit 1 of this preferred embodiment operates when the power receiving resonator 20 is located at the position shown in FIG. 3A. The power receiving resonator 20 located at the position shown in FIG. 3A couples more strongly with the first relay resonator 30-1 than any other resonator, and therefore, can receive energy from the power transmitting resonator 10 with high efficiency. Thus, in the exemplary arrangement shown in FIG. 3A, in order to transmit power from the power transmitting resonator 10 to the power receiving resonator 20, the power transmitting resonator 10 and the first relay resonator 30-1 are coupled together with a magnetic field that resonates at the resonant frequency f0.

In this case, the resonance signal generating section 40 applies a carrier, of which the primary frequency fc is equal to f0, to the power transmitting resonator 10. As a result, the power transmitting resonator 10 resonates at the frequency f0 and generates a resonant magnetic field with the frequency f0 in the surrounding space. And when the first relay resonator 30-1 resonates at the frequency f0, energy is transmitted wirelessly from the power transmitting resonator 10 to the first relay resonator 30-1 through that resonant magnetic field.

In the exemplary arrangement shown in FIG. 3A, the first relay resonator 30-1 and the power receiving resonator 20 are coupled together through that resonant magnetic field, and therefore, energy can be transferred from the first relay resonator 30-1 to the power receiving resonator 20. The output converting section 50 is connected after the power receiving resonator 20, and converts the energy that has been received by the power receiving resonator 20 into either DC or AC power (with a frequency of 50 Hz or 60 Hz, for example), and then supplies that power to any desired load 90.

In order to cut off (i.e., uncouple) the second relay resonator 30-2 of this preferred embodiment from the resonant magnetic field, a resonance adjustment circuit 60 that can change the resonant frequency of the second relay resonator 30-2 is connected to the second relay resonator 30-2. As shown in FIG. 3A, the resonance adjustment circuit 60 includes at least one of a switch, a capacitor C, an inductor L and a resistor.

The inductor, capacitor and resistor of the second relay resonator 30-2 are supposed to be arranged so that the second relay resonator 30-2 resonates at the frequency f0. In that case, by switching the opened/closed states of the two terminals of the second relay resonator 30-2 using the switch of the resonance adjustment circuit 60, for example, the resonant frequency of the second relay resonator 30-2 can be changed. That is to say, if the resonance adjustment circuit 60 grounds the second relay resonator 30-2 at any point, the resonant frequency of the second relay resonator 30-2 can be changed from f0 into a non-f0 value.

Alternatively, the resonance adjustment circuit 60 may also be designed so as to change the resonant frequency of the second relay resonator 30-2 by selectively adding or deleting at least one of a capacitor C, an inductor L and a resistor R to/from the resonant circuit that is formed by the second relay resonator 30-2. That is to say, this resonance adjustment circuit 60 can switch the resonant frequency of the second relay resonator 30-2 from f0 into a non-f0 value, and vice versa, by changing the magnitude of at least one of the inductance, capacitance and resistance of the resonant circuit formed by the second relay resonator 30-2. For that reason, when combined with that resonance adjustment circuit 60, the second relay resonator 30-2 can operate as a variable resonator as a whole. It should be noted that the resonance adjustment circuit 60 does not always have to change the resonant frequency of the relay resonator 30 in this manner.

In the exemplary arrangement shown in FIG. 3A, the power is transmitted from the power transmitting resonator 10 to the power receiving resonator 20 by way of the first relay resonator 30-1. That is to say, in this case, the second relay resonator 30-2 does not contribute to transmitting the power to the power receiving resonator 20. However, if the resonant frequency of the second relay resonator 30-2 were set to be f0, then the second relay resonator 30-2 would couple with the first relay resonator 30-1 unnecessarily. With such unwanted coupling produced, the energy that has once been transferred from the power transmitting resonator 10 to the first relay resonator 30-1 successfully would also be transferred to the second relay resonator 30-2 in vain. As a result, the power would be transferred from the first relay resonator 30-1 to the power receiving resonator 20 much less efficiently.

Thus, to avoid such an unwanted situation, the resonance adjustment circuit 60 changes the resonant frequency of the second relay resonator 30-2 into a non-f0 value in the arrangement shown in FIG. 3A, thereby uncoupling the second relay resonator 30-2 from the first relay resonator 30-1 and transferring power to the power receiving resonator 20 more efficiently.

Next, it will be described how the wireless power transmission unit 1 of this preferred embodiment operates in a situation where the power receiving resonator 20 is located at the position shown in FIG. 3B.

If the power receiving resonator 20 is arranged distant from the first relay resonator 30-1 and close to the second relay resonator 30-2 as shown in FIG. 3B, the relay function of the second relay resonator 30-2 is preferably used when power is transmitted to the power receiving resonator 20. That is why the resonance adjustment circuit 60 sets the resonant frequency of the second relay resonator 30-2 to be f0, thereby coupling the second relay resonator 30-2 with the first relay resonator 30-1.

In the examples illustrated in FIGS. 3A and 3B, the resonance adjustment circuit 60 is connected to only the second relay resonator 30-2. However, the resonance adjustment circuit 60 may also be connected to the first relay resonator 30-1. If the resonance adjustment circuit 60 is connected to the first relay resonator 30-1, the resonant frequency of the first relay resonator 30-1 can be changed. The present inventors carried out experiments to find how the efficiency of power transfer from the power transmitting resonator 10 to the power receiving resonator 20 changed depending on whether or not the second relay resonator 30-2 was coupled to the first relay resonator 30-1 at the resonant frequency f0. The results of the evaluation will be described next.

Figure 4:
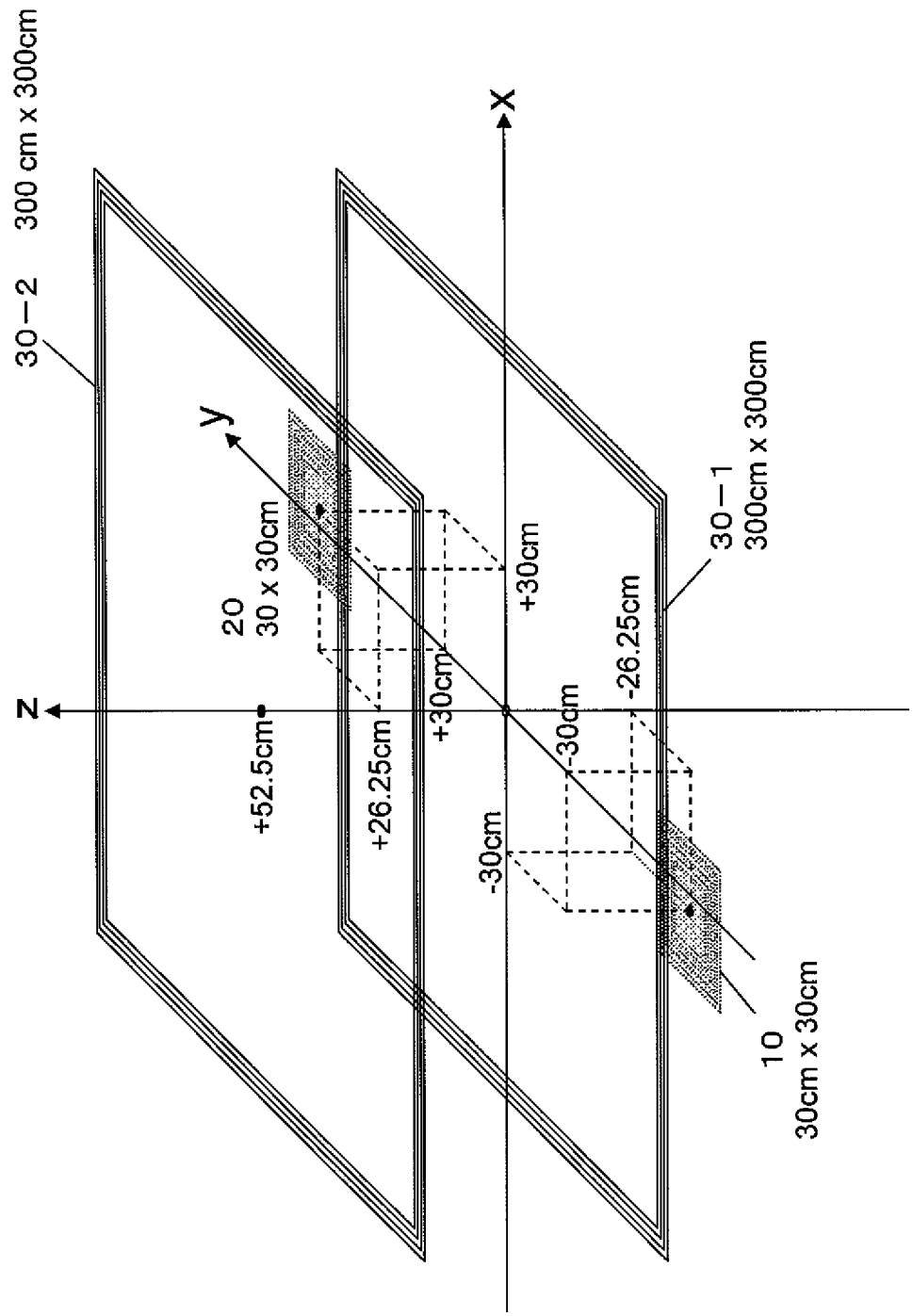
FIG. 4 is a schematic representation illustrating a transfer efficiency evaluation system for use in the first preferred embodiment of the present invention if there is any unnecessarily coupling relay resonator 30.

FIG. 4 schematically illustrates a system for evaluating the transfer efficiency in a situation where the second relay resonator 30-2 is coupled at the resonant frequency f0. In this case, every resonator has a resonator plane that is parallel to the xy plane, each of the power transmitting resonator 10 and the power receiving resonator 20 has a size of 30 cm square, and each of the first and second relay resonators 30-1 and 30-2 has a size of 300 cm square. Such a system can be established by arranging the relay resonators 30-1 and 30-2 at mutually different heights in the walls of a room, of which the floor has a square shape with a length of 3 m each side. In that case, the power receiving resonator 20 may be a resonator that is built in a laptop computer, of which the bottom has a size of 30 cm square and which is put in such a room.

In the system shown in FIG. 4, the respective centers of the power transmitting resonator 10, the power receiving resonator 20, the first relay resonator 30-1 and the second relay resonator 30-2 may have (x, y, z) coordinates of (−30 cm, −30 cm, −26.25 cm), (+30 cm, +30 cm, +26.25 cm), (0 cm, 0 cm, 0 cm), and (0 cm, 0 cm, +52.5 cm), respectively.

As a conductive wire for the resonators 10 and 30, a Litz wire, known as a parallel wire, was used. The number of turns of the conductive wires of the power transmitting and power receiving resonators 10, 20 was six and that of the relay resonators 30 was three. Both the carrier fc and the resonant frequency f0 of the respective resonators were set to be 500 kHz. And the inductor wire had an electrical conductivity of $7 \times 10^8$ S/m.

An electromagnetic field analysis was carried out under these conditions. As a result, the efficiency of power transfer from the power transmitting resonator 10 to the power receiving resonator 20 was 2.6%. The transfer efficiency declined so steeply probably because the coupling between the first and second relay resonators 30-1 and 30-2 was so strong that a lot of power would have been supplied unnecessarily to the second relay resonator 30-2. If those big relay resonators 30 are arranged densely so that the small power receiving resonator 20 can receive power efficiently at any arbitrary position, then the coupling between the relay resonators 30 will be strengthened.

Generally speaking, if the distance D between two resonators exceeds the length L of the smaller one of the resonators, then power transfer efficiency will decline steeply. That is why to let the power receiving resonator 20 receive power efficiently at an arbitrary position, it is preferred that the distance D between an arbitrary relay resonator 30 and the power receiving resonator 20 be at most approximately equal to the resonator length L of the power receiving resonators 20 that is the smaller one of the two resonators. It should be noted that if a given resonator has a square shape, then the resonator length L is the length of each side thereof. On the other hand, if the resonator has a rectangular shape, then the resonator length L is its shorter side length. And if the resonator has a circular shape, then the resonator length L is its diameter. For that reason, the distance between the relay resonators 30 is preferably not more than twice as long as the shorter side length of the power receiving resonator 20 or its diameter (if its inductor has a generally circular shape). Specifically, in the example illustrated in FIG. 4, the distance D between the relay resonators 30 is preferably no greater than about 60 cm in the example illustrated in FIG. 4.

Also, the smaller the ratio of the resonator length L of the smaller one of two resonators to the distance D between those two resonators (which will be referred to herein as an "L/D ratio"), the more steeply the power transfer efficiency declines. In this case, as for the combination of the first and second relay resonators 30-1 and 30-2, their L/D ratio is 300 cm/52.5 cm=5.714. On the other hand, as for the combination of the first relay resonator 30-1 and the power receiving resonator 20, their L/D ratio is 30/26.25=1.143. For that reason, the first relay resonator 30-1 will couple with the second relay resonator 30-2 more strongly than with the power receiving resonator 20. As a result, most of the energy distributed in the space surrounding the first relay resonator 30-1 is received by the second relay resonator 30-2 and the efficiency of power transfer to the power receiving resonator 20 declines significantly.

Figure 5:
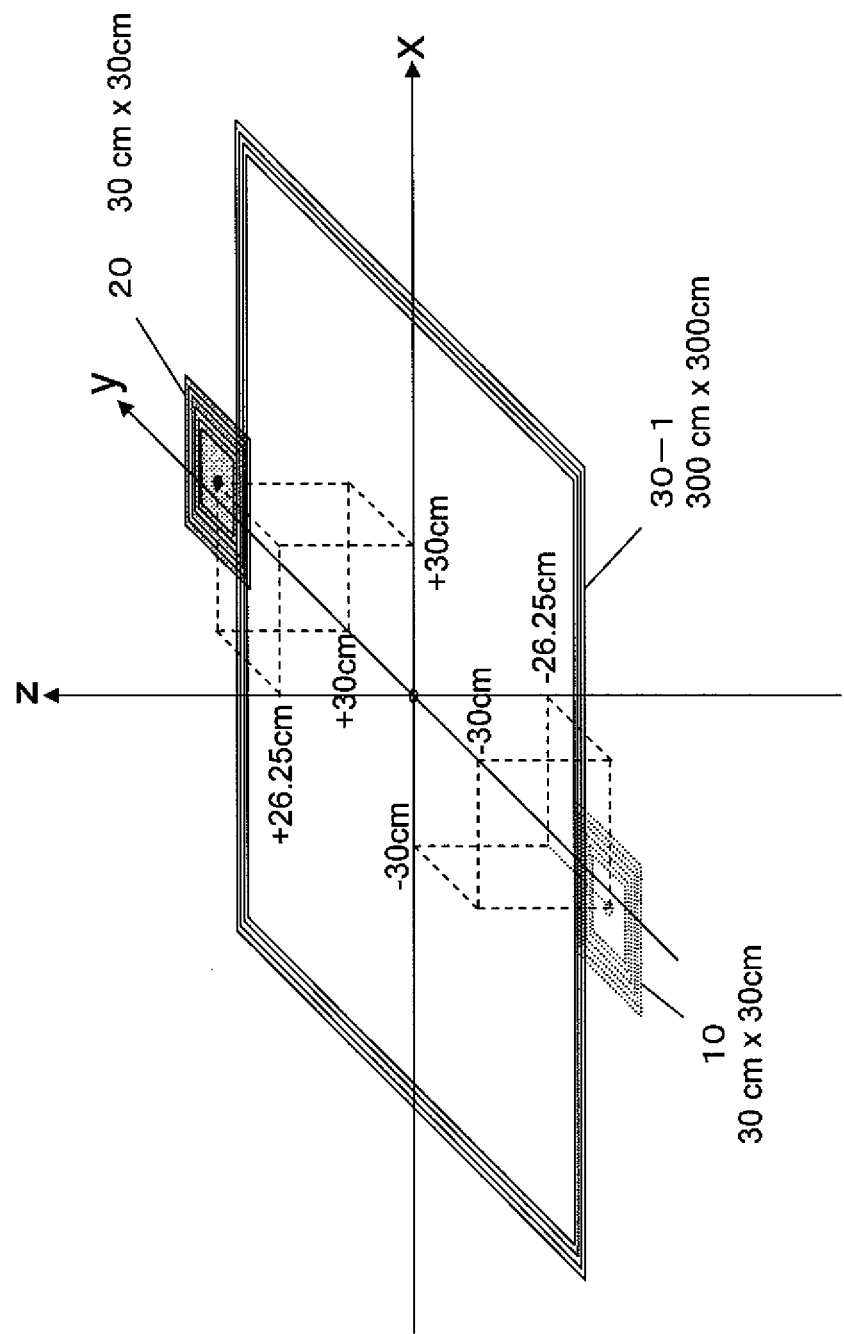
FIG. 5 is a schematic representation illustrating a transfer efficiency evaluation system for use in the first preferred embodiment of the present invention if there is any unnecessarily coupling relay resonator 30.

On the other hand, FIG. 5 illustrates an evaluation system, which adopts the same evaluation condition as its counterpart shown in FIG. 4 but from which the second relay resonator 30-2 is removed. That is to say, this can be regarded as an evaluation system that is controlled so that the second relay resonator 30-2 is uncoupled at the resonant frequency f0. When the condition described above was adopted, the efficiency of power transfer from the power transmitting resonator 10 to the power receiving resonator 20 could be increased to 69.6% as a result. Comparing the power transfer efficiencies achieved by the two evaluation systems shown in FIGS. 4 and 5 with each other, it can be seen that the efficiency can be increased approximately twenty-sevenfold by uncoupling the unnecessary relay resonator 30. It should be noted that the evaluation described above was made on the supposition that the respective centers of the resonator planes of the first and second relay resonators 30-1 and 30-2 were located on the z-axis. However, the effects of the present invention should also be achieved sufficiently even if the centers of those resonators shifted from the z-axis.

As described above, according to this preferred embodiment, by selectively coupling or uncoupling the relay resonators 30 (i.e., by changing the resonance conditions such as the resonant frequency) according to the position of the power receiving resonator 20, power can be transmitted highly efficiently to a broader range of positions. In this case, the resonance conditions may be changed manually by the user according to the position of the power receiving resonator 20. For example, the user may enter information designating which relay resonator 30 should be located closest to the power receiving resonator 20 into the resonance control section 600 by him- or herself.

It should be noted that in order to ensure sufficient portability and flexibility of installation for the power receiving resonator 20, the position of the power receiving resonator 20 is preferably detected regularly and the resonance conditions imposed on the relay resonators 30 are preferably changed when the power receiving resonator 20 has changed its position (i.e., has moved). However, such a position change of the power receiving resonator 20 is preferably detected by a power receiving position detecting section, not manually.

Embodiment 2

Hereinafter, another preferred embodiment of a wireless power transmission system according to the present invention will be described with reference to FIG. 6, which illustrates an exemplary arrangement for a wireless power transmission unit 1 according to this second preferred embodiment.

This wireless power transmission unit 1 includes a power transmitting section 100 that resonates at a resonant frequency f0, relay sections 300 that can resonate at a selected one of multiple frequencies including that resonant frequency f0, a resonance control section 600 for controlling resonance conditions imposed on the relay sections 300, and a power receiving position detecting section 70 for detecting the position of the power receiving resonator 20. It should be noted that since the power receiving resonator 20 forms part of the power receiving section 200, an approximate position of the power receiving resonator 20 can be detected by detecting the position of the power receiving section 200.

The power receiving position detecting section 70 detects the position of the power receiving resonator 20 (which will be referred to herein as a "power receiving position") and outputs information about the position detected (which will be referred to herein as "position information"). This position information is sent to the resonance control section 600 by way of a telecommunications section 80.

Figure 6:
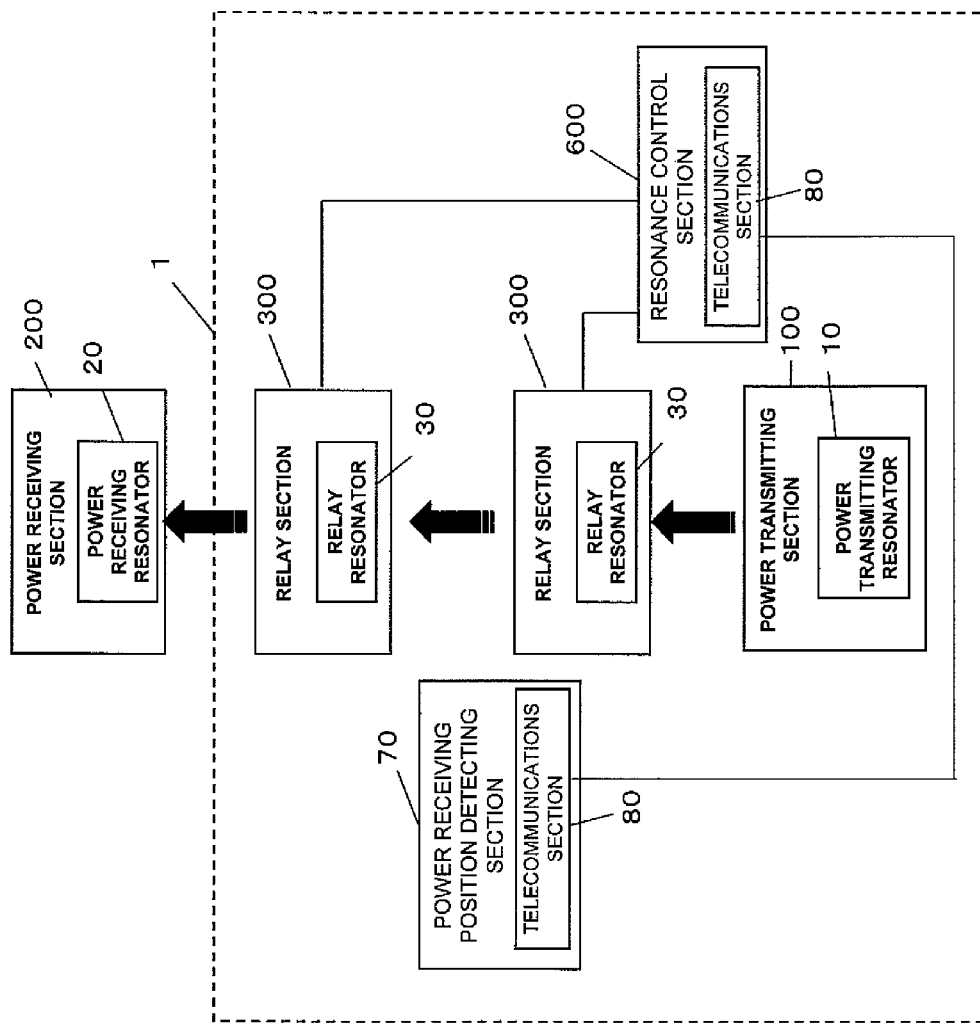
FIG. 6 illustrates an arrangement for a wireless power transmission unit 1 as a second preferred embodiment of the present invention.
Figure 7:
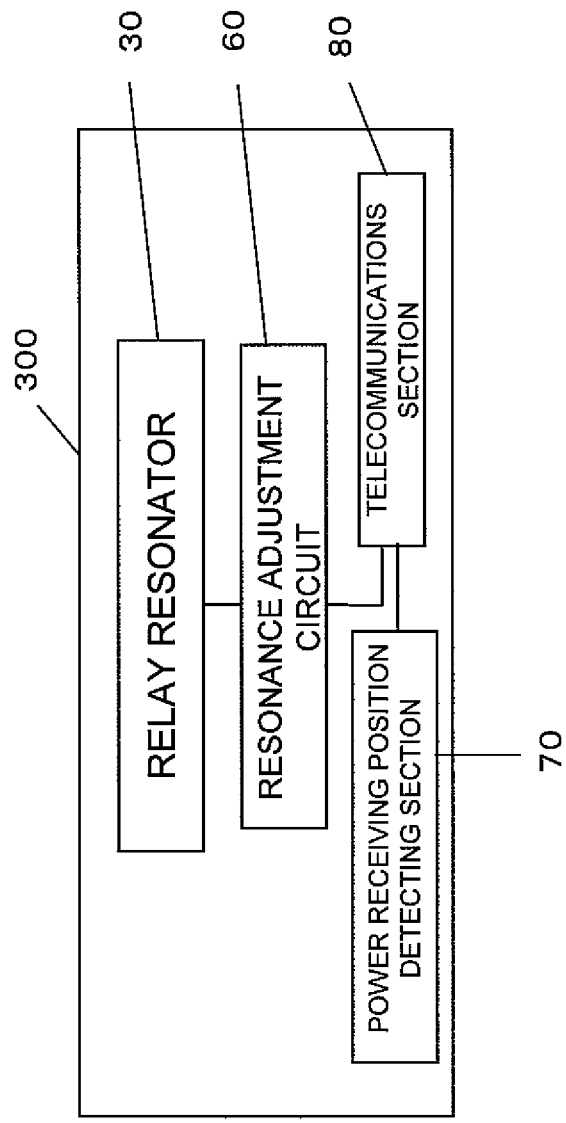
FIG. 7 illustrates a basic configuration for a relay section 300 according to the second preferred embodiment.

In FIG. 6, the power receiving position detecting section 70 is illustrated as a component that is provided separately from the power transmitting section 100 and the relay sections 300. However, the power receiving position detecting section 70 may also be built in the power transmitting section 100 or one of the relay sections 30. FIG. 7 illustrates an example in which the power receiving position detecting section 70 is built in the relay section 300. In this example, the telecommunications section 80 not just receives a resonance control signal from the resonance control section 600 but also can convey the position information provided by the power receiving position detecting section 70 to the resonance control section 600. As already described for the first preferred embodiment, the telecommunications section 80 may transmit a signal (or information) either through a wire or wirelessly.

With the power receiving position detecting section 70 provided for the wireless power transmission unit of the present invention, even if the position of the power receiving resonator 20 changes from time to time, the power receiving position detecting section 70 can detect that position and change the resonance conditions imposed on the relay resonators 30 anytime at all. Such a change of the resonance conditions will be referred to herein as an "adaptive change of the resonance conditions".

Figure 8:
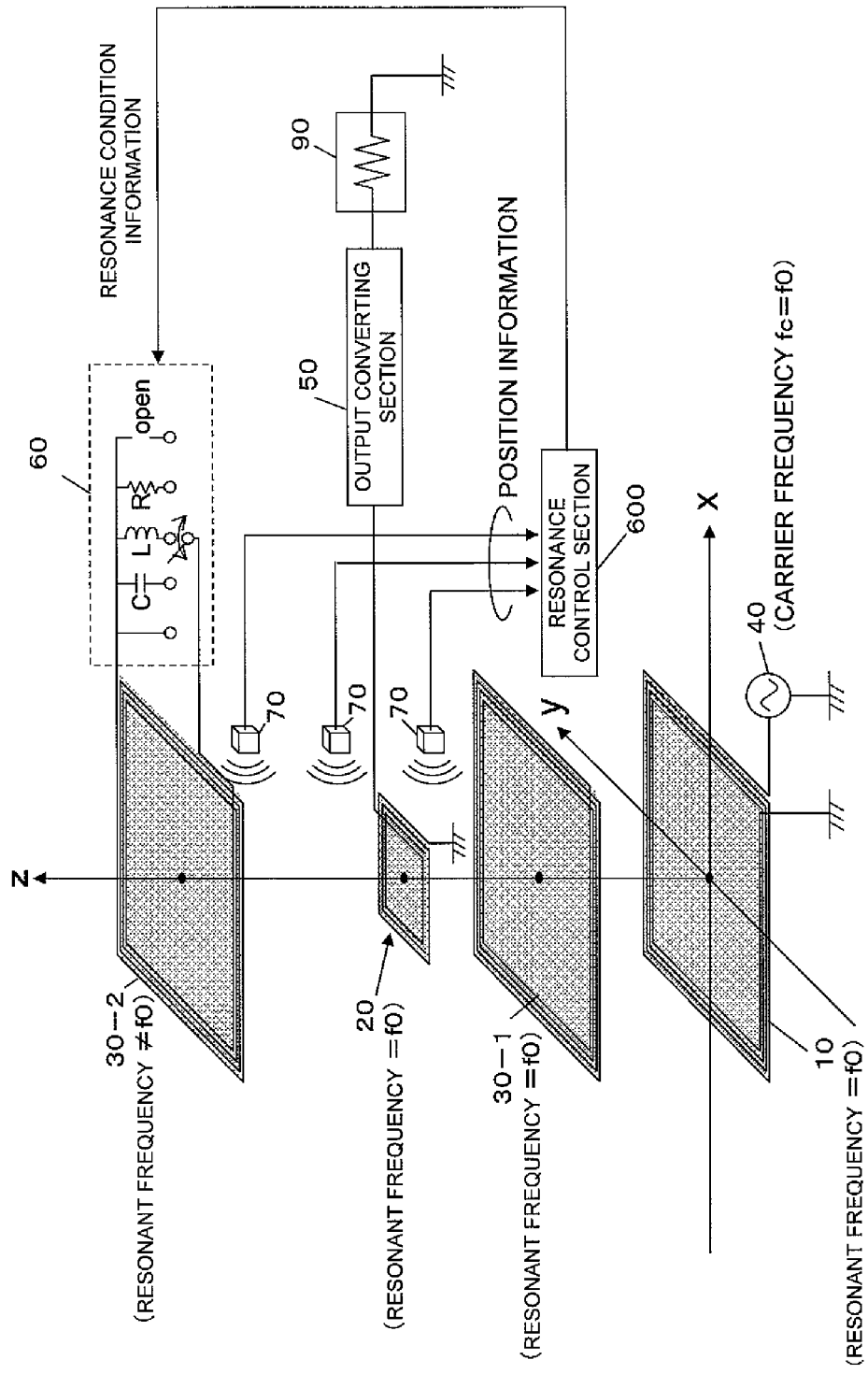
FIG. 8 illustrates an exemplary arrangement for a wireless power transmission system according to the second preferred embodiment of the present invention.

Next, let's make reference to FIG. 8, which illustrates an exemplary arrangement of resonators 10, 20 and 30 according to this preferred embodiment. In the example illustrated in FIG. 8, multiple power receiving position detecting sections 70 are arranged. With multiple power receiving position detecting section 70 arranged, the position of the power receiving resonator 20 can be detected highly accurately.

The power receiving position detecting section 70 can determine the position of the power receiving resonator 20 by any of various methods including the following ones:

(1) shoot a photo of the power receiving resonator 20 and determine the position of the power receiving resonator 20 by image recognition;
(2) emit either a radio wave or light and determine the position of the power receiving resonator 20 based on the radio or light wave that has been reflected from the power receiving resonator 20; and
(3) attach a beacon generator or any other appropriate signaling device to the power receiving resonator 20, receive a signal from the power receiving resonator 20 and determine the position of the power receiving resonator 20 based on that signal.

Optionally, the power receiving position detecting section 70 may detect the positions of the power transmitting resonator 10 and the relay resonators 30, too. Then, the distance between those resonators 10, 30 and the power receiving resonator 20 can be estimated more accurately.

Figure 9:
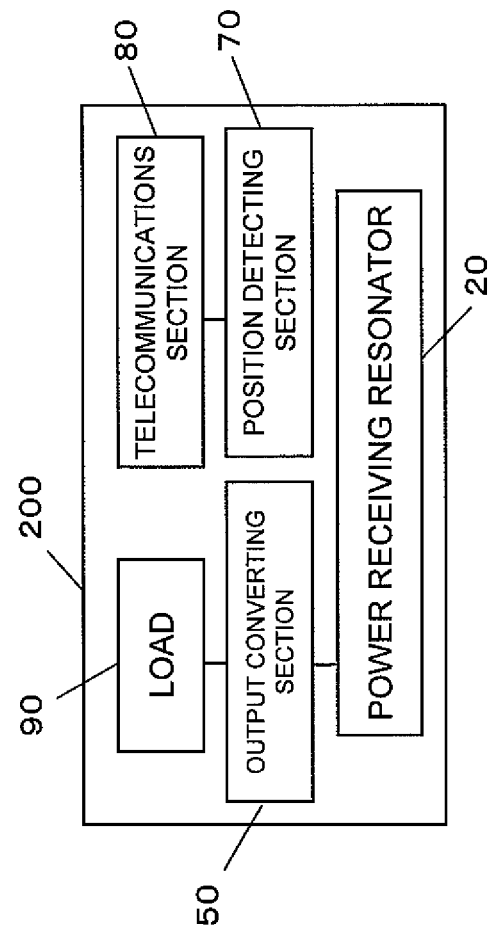
FIG. 9 illustrates a basic arrangement for a power receiving section 200 according to the second preferred embodiment.

Also, the power receiving section 200 itself may have a configuration for detecting its own position. FIG. 9 illustrates an example of a power receiving section 200 with such a configuration. The power receiving section 200 shown in FIG. 9 includes not only the power receiving resonator 20, an output converting section 50 that is connected to the power receiving resonator 20, and a load 90 that is connected to the output converting section 50 but also a power receiving position detecting section 70 and a telecommunications section 80 that is connected to the power receiving position detecting section 70 as well. The telecommunications section 80 can convey information about the power receiving position that has been detected by the power receiving position detecting section 70 (i.e., the position information) to the resonance control section 600.

The resonance control section 600 sets a resonance condition to be imposed on each relay resonator 30 based on the information about the position of the power receiving resonator 20. Examples of parameters that determine the "resonance condition" include the resonant frequencies of the respective relay resonators 30 and information about the status of each relay resonator that is either coupled with, or uncoupled from, a resonant magnetic field.

The resonance adjustment circuit 60 that is connected to the second relay resonator 30-2 controls the resonant frequency of the second relay resonator 30-2 by reference to the resonance condition information provided by the resonance control section 600, thereby setting a coupling or uncoupling condition (i.e., the resonance condition).

According to this preferred embodiment, the resonance condition imposed on the relay resonators can be changed as needed in response to any change of the position of the power receiving resonator 20.

In this wireless power transmission unit, the resonance adjustment circuit 60 is connected to only the second relay resonator 30-2. However, the resonance adjustment circuit 60 may also be connected to each of the multiple relay resonators 30 as well. In that case, coupling or uncoupling each of the multiple relay sections 300 to/from a resonant magnetic field can be controlled. As a result, power can be transmitted even more efficiently according to the arrangement of the power receiving section 200.

Hereinafter, it will be described how to set the resonance condition to be imposed on each of the first and second relay resonators 30-1 and 30-2 in a wireless power transmission unit in which the resonance adjustment circuit 60 is connected to each of the two relay resonators 30.

Figure 10:
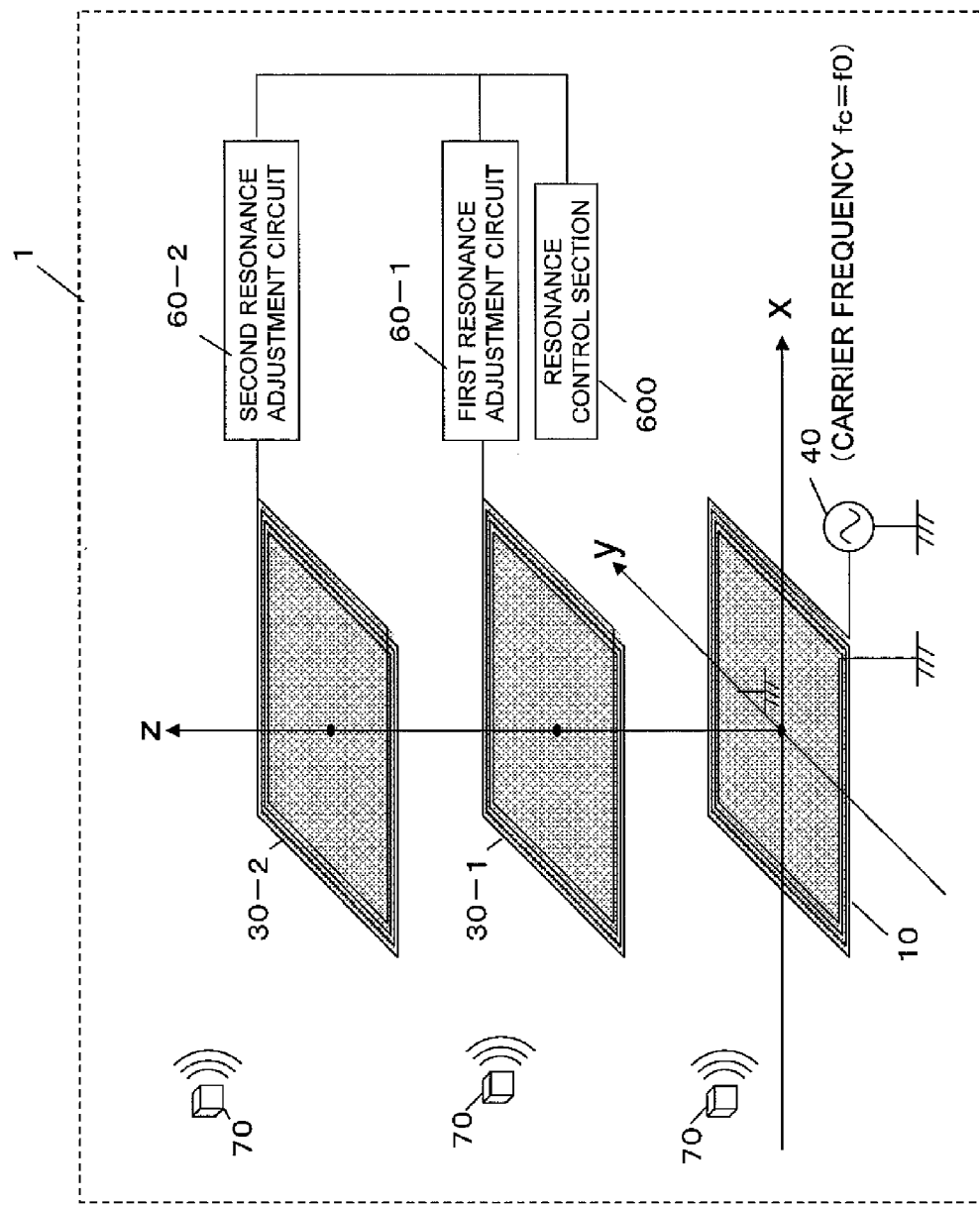
FIG. 10 illustrates an exemplary arrangement for the second preferred embodiment in which a resonance adjustment circuit 60 is connected to each of the relay resonators 30-1 and 30-2.

First of all, look at FIG. 10, which illustrates an arrangement for a wireless power transmission unit in which the resonance adjustment circuit 60 is connected to each of the first and second relay resonators 30-1 and 30-2. Even in the example illustrated in FIG. 10, through a resonant magnetic field with the frequency f0, not only can the power transmitting resonator 10 and the first relay resonator 30-1 be coupled together but also can the first and second relay resonators 30-1 and 30-2 be coupled together as well.

Figure 11A:
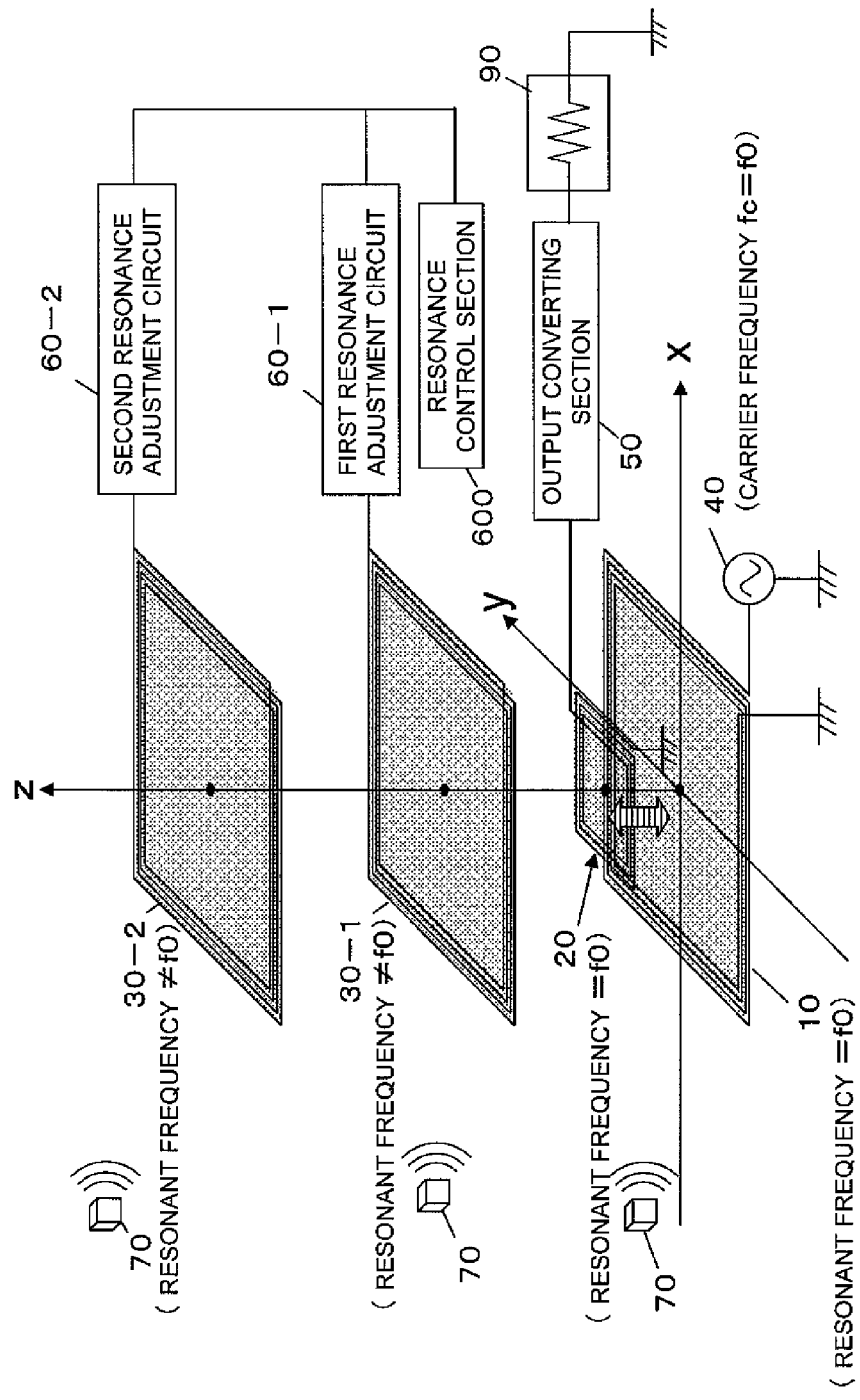
FIG. 11A illustrates a situation where the power receiving resonator 20 is arranged close to the power transmitting resonator 10 in the wireless power transmission unit 1 of the second preferred embodiment.
Figure 11B:
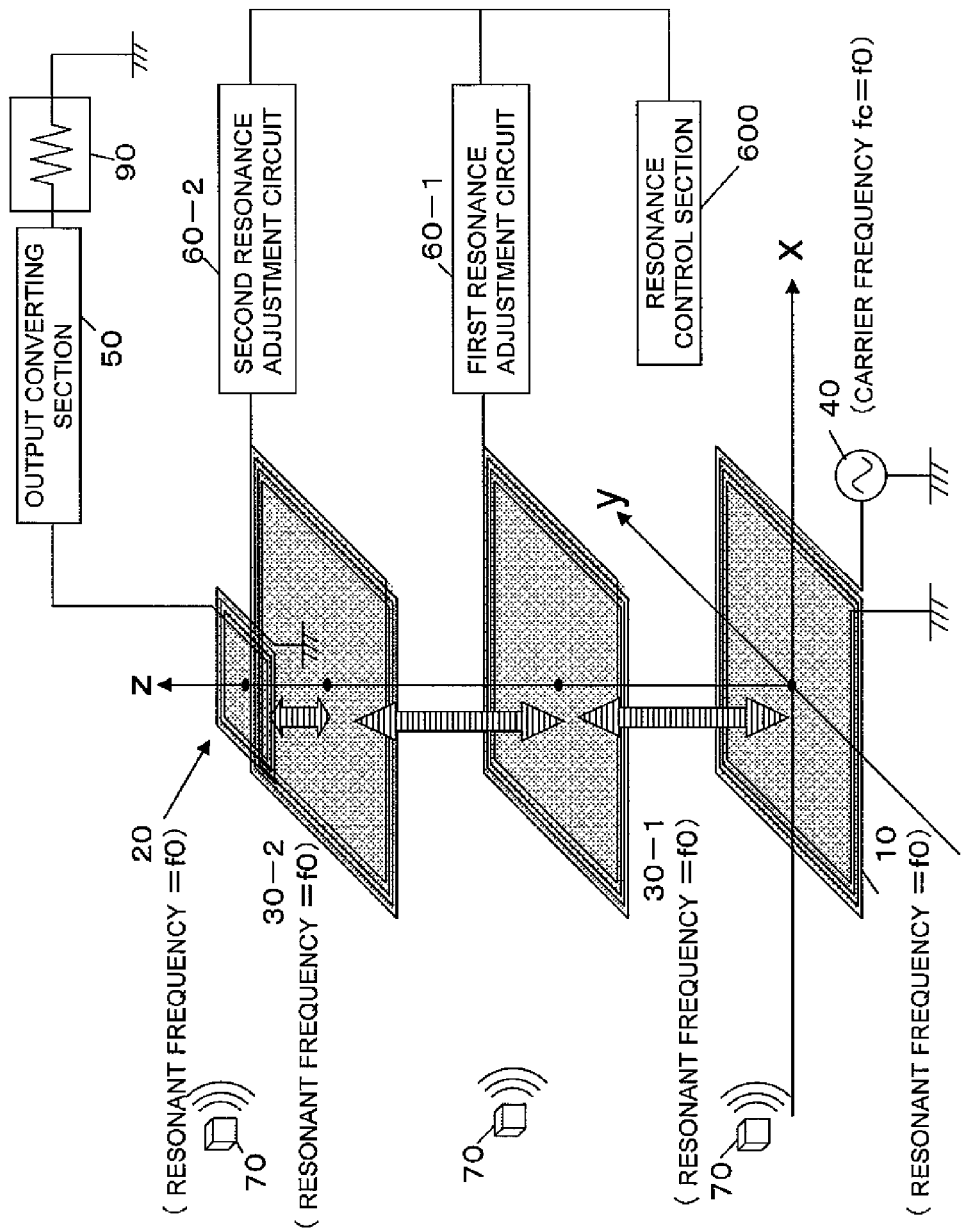
FIG. 11B illustrates a situation where the power receiving resonator 20 is arranged close to the second relay resonator 30-2 in the wireless power transmission unit of the second preferred embodiment.

Next, turn to FIGS. 11A and 11B, which illustrate two situations where the power receiving resonator 20 is arranged at mutually different positions with respect to the wireless power transmission unit 1 shown in FIG. 10.

In the example illustrated in FIG. 11A, the power transmitting resonator 10 and the power receiving resonator 20 are arranged close enough to be coupled together directly through a resonant magnetic field. That is why there is no need to use any relay resonator 30 to transmit power wirelessly, and therefore, the resonant frequency of every relay resonator 30 may be set to fall within a non-coupling frequency range. Nevertheless, if there are too many relay resonators 30, it may be troublesome to control the resonant frequency of every relay resonator 30 so that its frequency falls within that non-coupling frequency range. In that case, only the relay resonator 30-1 that is located close to the power transmitting resonator 10 may be uncoupled.

On the other hand, in the example illustrated in FIG. 11B, the power receiving resonator 20 is arranged so close to the second relay resonator 30-2 as to be coupled to the second relay resonator 30-2. In the exemplary arrangement shown in FIG. 11B, if the resonant frequency of the first relay resonator 30-1 is set to be a non-f0 value so that the first and second relay resonators 30-1 and 30-2 are uncoupled from each other, then sometimes power cannot be transmitted from the power transmitting resonator 10 to the second relay resonator 30-2. In that case, if the resonant frequency of the first relay resonator 30-1 is also set to be a non-f0 value, power cannot be supplied to the power receiving resonator 20, either. That is why even if the relay resonator 30 (i.e., the first relay resonator 30-1 in the example illustrated in FIG. 11B), which needs to be used to supply power to the relay resonator 30 that is arranged closest to the power receiving resonator 20 (i.e., the second relay resonator 30-2 in FIG. 11B), is not closest to the power receiving resonator 20, the relay resonator 30 needs to be controlled so as to be coupled to the power receiving resonator 20 at the resonant frequency f0.

If the gap between the power transmitting resonator 10 and the first relay resonator 30-1 and the gap between the first and second relay resonators 30-1 and 30-2 are narrow, then the coupling between the power transmitting resonator 10 and the second relay resonator 30-2 could sometimes be too strengthened even when the resonant frequency of the first relay resonator 30-1 is set to be different from f0. In that case, the first relay resonator 30-1 may be uncoupled.

Thus, in such a situation where the gap between multiple relay resonators 30 is narrow, even if the middle one of the relay resonators is uncoupled, sometimes power can still be supplied from the power transmitting resonator 10 to the power receiving resonator 20 by way of the other relay resonator 30 that is coupled to all of the other resonators. Furthermore, to increase the power transfer efficiency, it is sometimes preferred to uncouple the unnecessary relay resonator 30.

If an unnecessary relay resonator 30 is uncoupled, the distance between the resonators to be coupled together extends so much as to cause some power loss. Meanwhile, power is also lost while the relay resonator 30 is receiving electromagnetic energy and releasing the energy again. If the power to be lost during that relaying process is greater than the power to be lost by extending the distance between the relay resonators 30, then it is preferred that the number of relay resonators to be coupled together be reduced.

Figure 12:
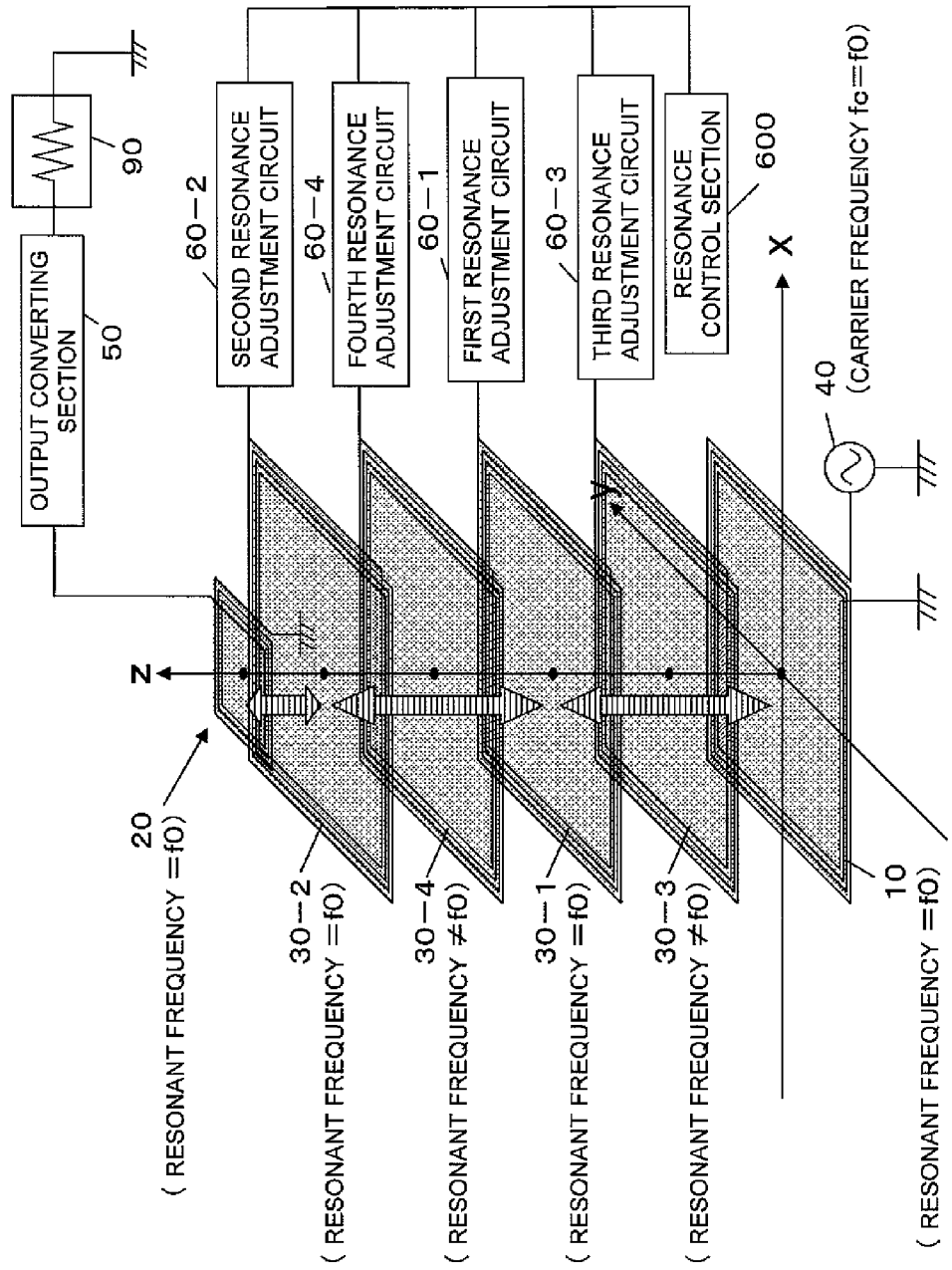
FIG. 12 illustrates an exemplary situation where some of the relay resonators 30 interposed between the power transmitting section 10 and the power receiving resonator 20 do not contribute to relaying power in the wireless power transmission unit of the second preferred embodiment of the present invention.

FIG. 12 illustrates a wireless power transmission system with four relay resonators 30-1, 30-2, 30-3 and 30-4, to which four resonance adjustment circuits 60-1, 60-2, 60-3 and 60-4 are respectively connected.

The gap between two adjacent resonators is narrower in the wireless power transmission system shown in FIG. 12 than in the system shown in FIG. 10. Specifically, in the arrangement shown in FIG. 12, the third relay resonator 30-3 is arranged between the power transmitting resonator 10 and the first relay resonator 30-1, and the fourth relay resonator 30-4 is arranged between the first and second relay resonators 30-1 and 30-2.

Since the distances from the third and first relay resonators 30-3 and 30-1 to the power transmitting resonator 10 are relatively short, the third and first relay resonators 30-3 and 30-1 can be coupled to the power transmitting resonator 10 by controlling the resonant frequency. Likewise, the third relay resonator 30-3 can be coupled to the power transmitting resonator 10 and the first and fourth relay resonators 30-1 and 30-4. The first relay resonator 30-1 can be coupled to the power transmitting resonator 10 and the third, fourth and second relay resonators 30-3, 30-4, and 30-2. The fourth relay resonator 30-4 can be coupled to the third, first and second relay resonators 30-3, 30-1, and 30-2. And the second relay resonator 30-2 can be coupled to the first and fourth relay resonators 30-1 and 30-4 and the power receiving resonator 20.

In such an arrangement, if power should be supplied to the power receiving resonator 20, power may be supplied to the second relay resonator 30-2 that is coupled to the power receiving resonator 20. Also, if power should be supplied to the second relay resonator 30-2, power may be supplied to the fourth or first relay resonator 30-4 or 30-1. If it is effective to uncouple some of the relay resonators, then power may be supplied to the first relay resonator 30-1, which is one of the relay resonators that can be coupled to the second relay resonator 30-2 and which is located more distant from the second relay resonator 30-2 than the other relay resonator 30-4 is. If power should be supplied to the first relay resonator 30-1, then power may be either supplied through the third relay resonator 30-3 or directly from the power transmitting resonator 10. If it is effective to reduce the number of intervening relay resonators, then power may be supplied to the first relay resonator 30-1 directly from the power transmitting resonator 10, which is located more distant from the first relay resonator 30-1 than the relay resonator 30-3 is. That is to say, in that case, power may be supplied from the power transmitting resonator 10 to the power receiving resonator 20 by way of only the first and second relay resonators 30-1 and 30-2. To relay the power in this manner, the respective resonant frequencies of the third and fourth relay resonators 30-3 and 30-4 may be set to be non-f0 values.

If the power receiving resonator 20 is small, then it is preferred that a number of relay resonators 30 be arranged densely. In that case, it can be effective to reduce the number of intervening relay resonators by uncoupling some of those relay resonators 30.

In order to increase the efficiency of power transfer to the power receiving resonator 20 by reducing the number of intervening relay resonators, it could be effective, depending on the size of the power receiving resonator 20, to uncouple the relay resonator 30 that is located closest to the power receiving resonator 20.

Figure 13:
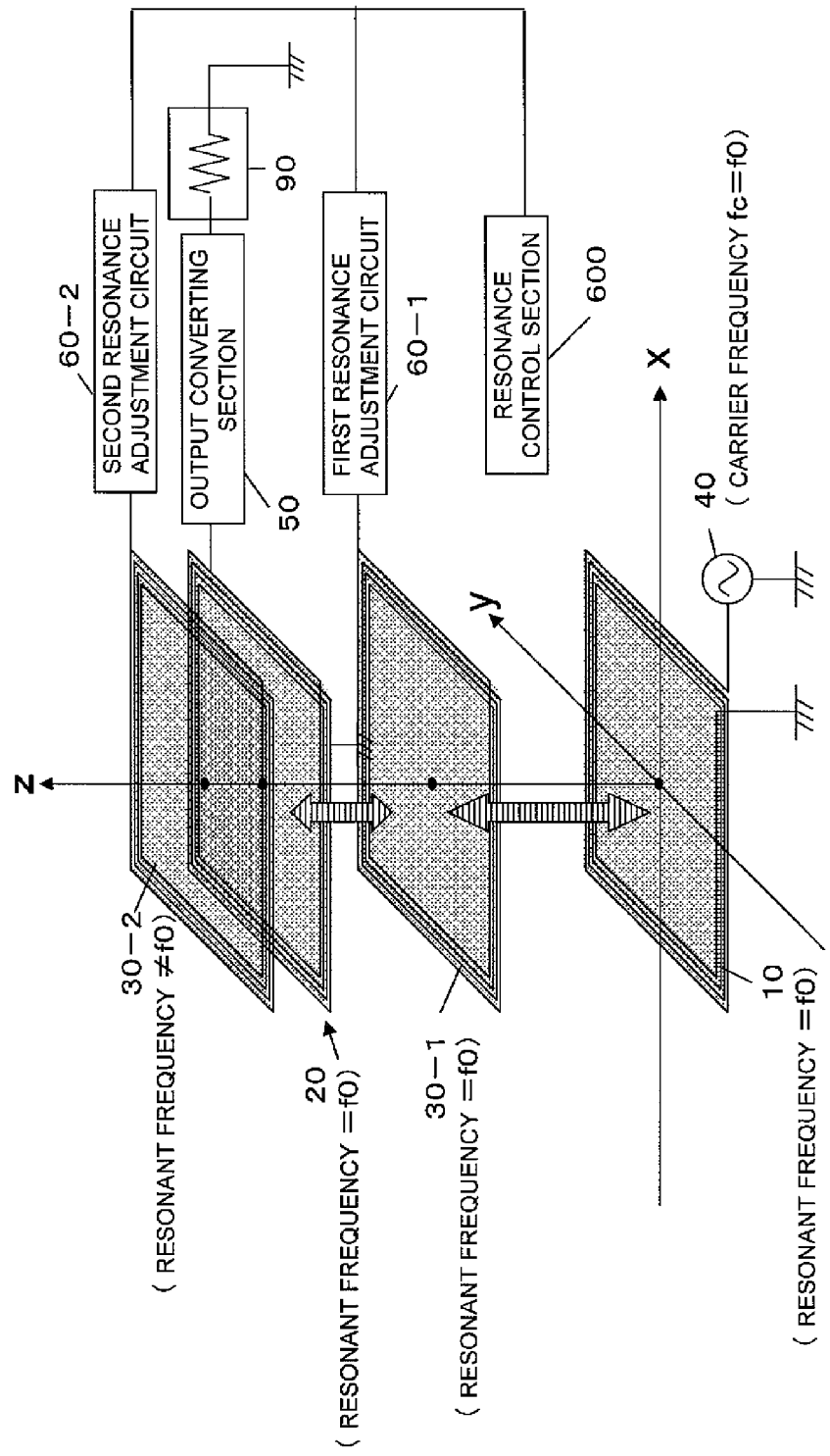
FIG. 13 illustrates an exemplary situation where the power receiving resonator 20 that is arranged closest to the second relay resonator 30-2 is coupled to the first relay resonator 30-1 in the wireless power transmission unit of the second preferred embodiment of the present invention.

Now, let us make reference to FIG. 13, which illustrates a situation where the size of the power receiving resonator 20 is substantially equal to that of the relay resonators 30. Specifically, in the example illustrated in FIG. 13, the power receiving resonator 20 is arranged between the first and second relay resonators 30-1 and 30-2 and located closer to the second relay resonator 30-2 than to any other resonator. In this example, at the resonant frequency f0, coupled are not only the power transmitting resonator 10 and the first relay resonator 30-1 but also the first and second relay resonators 30-1 and 30-2 as well. On top of that, this power receiving resonator 20 has so large a size as to be coupled to not only the second relay resonator 30-2 that is located closest to the power receiving resonator 20 but also the first relay resonator 30-1. That is why in order to reduce the number of intervening relay resonators, it is preferred that power be supplied from the power transmitting resonator 10 to the power receiving resonator 20 by way of only the first relay resonator 30-1. Consequently, in order to prevent the second relay resonator 30-2 from being coupled to the first relay resonator 30-1 or the power receiving resonator 20 unnecessarily, the second relay resonator 30-2 may be controlled so as to get uncoupled at the resonant frequency f0.

By changing the resonance condition imposed on the relay resonators 30 with not only the position of the power receiving resonator 20 but also its size taken into consideration in this manner, high efficiency power transfer can get done with good stability over a broad range.

As described above, the position information and the resonance condition information can be exchanged either through a wire or wirelessly. If information is exchanged by wireless communication, interference between the wireless power transmission and the wireless communication should be avoided. And to avoid such interference, it is preferred that the communication frequency range do not overlap with any of the resonant frequencies of the respective resonators, the carrier frequency and their harmonics frequencies (which are integral multiples of those resonant frequencies). Optionally, telecommunications may be done by way of the resonators 10, 20 and 30 by modulating the carrier for use to transmit power.

Optionally, instead of supplying power to every power receiving section 200 that falls within a range in which power can be transmitted wirelessly, power may be supplied to only an authenticated power receiving section 200. In that case, the resonance control section 600 may request the power receiving section 200 to send authentication information by telecommunication. And only when the resonance control section 600 gets correct authentication information from the power receiving section 200, the control section 600 may transmit power to that power receiving section 200. In this manner, the information to be exchanged by telecommunication between all or part of the resonance control section 600, the power receiving section 200 and the relay section 300 includes not just the resonance condition information and the power receiving position information but also the authentication information and any other kind of information as well.

In the accompanying drawings, each of the resonators is illustrated as a wire that is wound in a square shape on a single plane. This wire forms the inductor of the resonator. Although not shown, a capacitor and other circuit components are connected to the inductor of the resonator either in series or in parallel.

Figure 14:
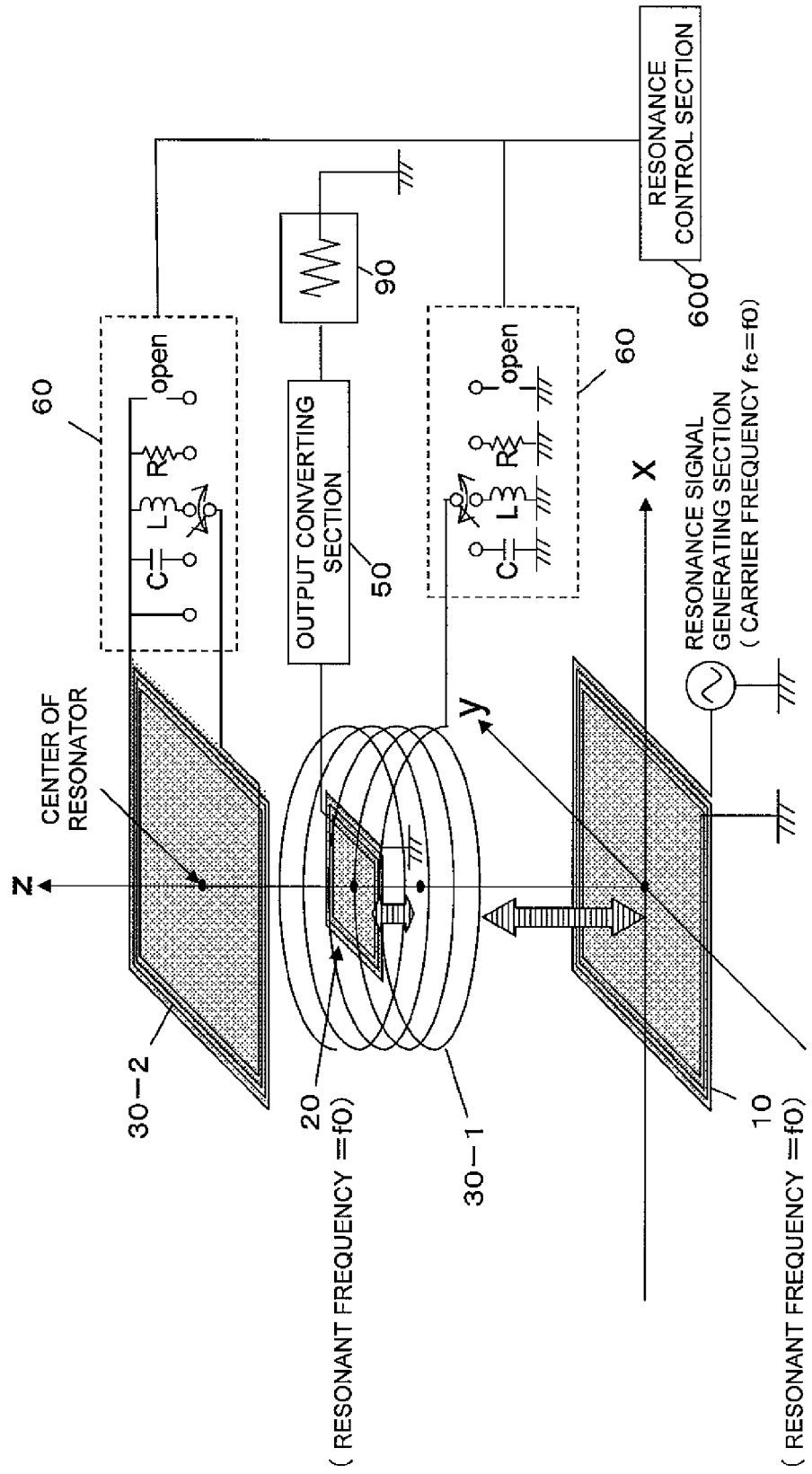
FIG. 14 illustrates an exemplary situation where a spiral ring inductor with one open terminal is arranged as the relay resonator 30 in the wireless power transmission unit of the second preferred embodiment of the present invention.

It should be noted that the resonators do not always have to have the illustrated shape. FIG. 14 illustrates a first relay resonator 30-1, which is implemented as s spiral inductor that has a thickness in the z-axis direction. Also, the second relay resonator 30-2 shown in FIG. 14 is not a closed loop circuit but implemented as a ring wire, of which one terminal is open.

In the preferred embodiments of the present invention described above, the resonator planes of the respective resonators 10, 20 and 30 are supposed to be parallel to the xy plane. However, the resonator planes of the resonators 10, 20 and 30 do not always have to be parallel to the xy plane but may face an arbitrary direction. Nevertheless, in order to increase the efficiency of wireless power transmission, the respective resonator planes of the resonators 10, 20 and 30 are preferably substantially parallel to each other. In this description, if one resonator is "substantially parallel to" another resonator, then it means herein that the angle defined by their resonator planes falls within the range of 0 degrees through 30 degrees. But even if the angle defined by the resonator planes is too large to regard those planes "substantially parallel" to each other (e.g., within the range of more than degrees to not more than 60 degrees (45 degrees, for example)), power can still be transmitted wirelessly.

Embodiment 3

Figure 15:
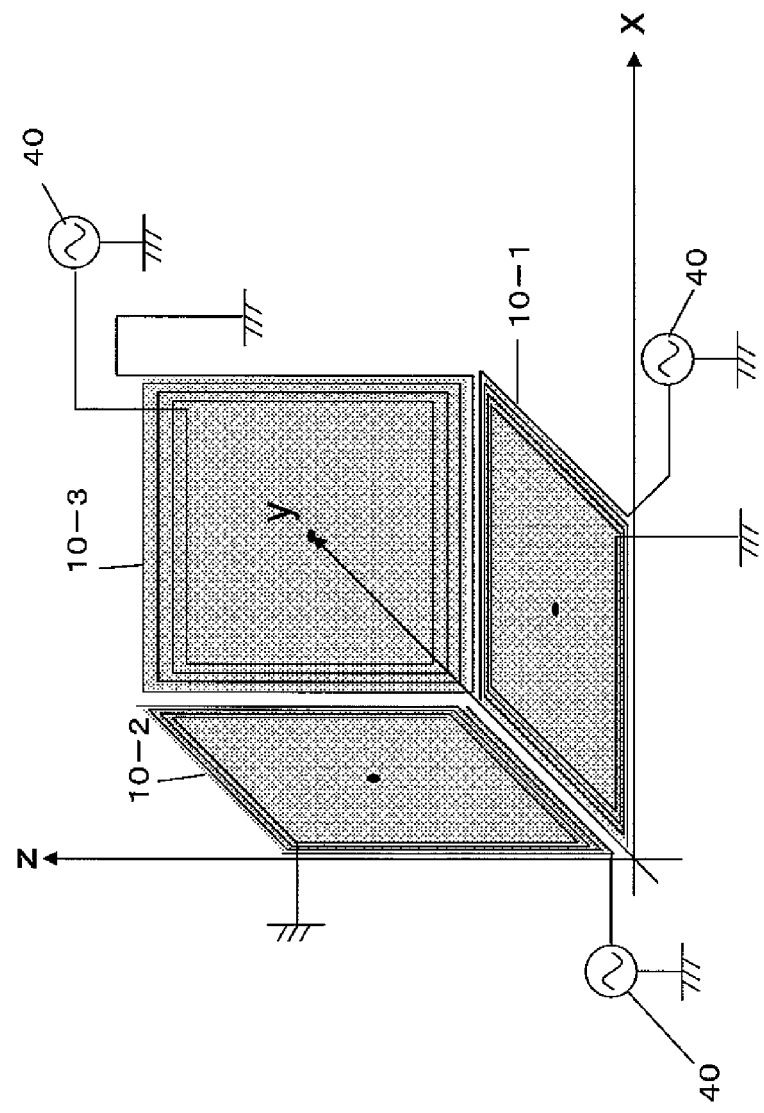
FIG. 15 illustrates an exemplary arrangement of three power transmitting resonators 10-1, 10-2, and 10-3 in a wireless power transmission unit according to a third preferred embodiment of the present invention.

Hereinafter, still another preferred embodiment of a wireless power transmission unit according to the present invention will be described with reference to FIG. 15. The wireless power transmission unit of this preferred embodiment includes three power transmitting resonators 10-1, 10-2, and 10-3. FIG. 15 illustrates the arrangement of these power transmitting resonators 10-1, 10-2, and 10-3 but omits illustration of relay resonators.

In the wireless power transmission unit of this preferred embodiment, the resonator planes of these three power transmitting resonators 10-1, 10-2, and 10-3 are parallel to the xy, yz and zx planes, respectively. If the power receiving resonator 20 is put in the rectangular parallelepiped space that is defined by these three power transmitting resonators 10-1, 10-2, and 10-3, power can always be transmitted from the three power transmitting resonators 10-1, 10-2, and 10-3 to the power receiving resonator 20, no matter which direction the power receiving resonator 20 faces (i.e., no matter what posture the power receiving resonator 20 has).

As for the multiple relay resonators, they may be arranged so that their resonator planes are parallel to either the xy plane as in the preferred embodiment described above or the yz or zx plane. Still alternatively, multiple relay resonators may also be arranged so that at least one resonator plane of theirs is parallel to each of the xy, yz and zx planes. For example, a number of relay resonators may be arranged in combination so that some of them have resonator planes that are parallel to the xy plane, others have resonator planes that are parallel to the yz plane, and the rest has resonator planes that are parallel to the zx plane.

If the wireless power transmission unit includes those three power transmitting resonators 10-1, 10-2, and 10-3, the power receiving section 200 may have a sensor (such as a gyroscope) for detecting the resonator plane direction of its power receiving resonator 20 in a preferred example. The direction information to be obtained as a result of the detection that has been made by the sensor may be conveyed to the resonance control section 600 by way of the telecommunications section of the power receiving section 200. The resonance control section 600 instructs one of the power transmitting resonators 10-1, 10-2, and 10-3, of which the resonator plane is parallel to the direction in which the power receiving section 200 will have higher power receiving efficiency than with any other power transmitting resonator, to transmit power. In this case, if a number of relay resonators, of which the resonator planes face mutually different directions, are arranged, it is preferred that one of the relay resonators 30, of which the resonator plane is parallel to the direction in which the power receiving efficiency becomes higher than in any other relay resonator 30, have its resonant frequency set to be f0 and the other relay resonators 30 have their resonant frequencies set to be non-f0 values.

If the wireless power transmission unit of the present invention includes multiple power transmitting resonators 10, of which the resonator planes face mutually different directions, the "arrangement of the power receiving section" is supposed herein to refer to not just the position of the power receiving resonator 20 but also the resonator plane direction (or orientation) of the power receiving resonator 20.

Embodiment 4

In the preferred embodiments of the present invention described above, each resonance adjustment circuit 60 is connected to its associated relay resonator 30 and used to adjust the resonant frequency of the relay section 300. However, the resonance adjustment circuit 60 may also be connected to the power transmitting resonator 10 or the power receiving resonator 20.

Hereinafter, a wireless power transmission system in which the resonance adjustment circuit 60 is connected to the power transmitting resonator 10 and the power receiving resonator 20 will be described as an example.

Figure 16:
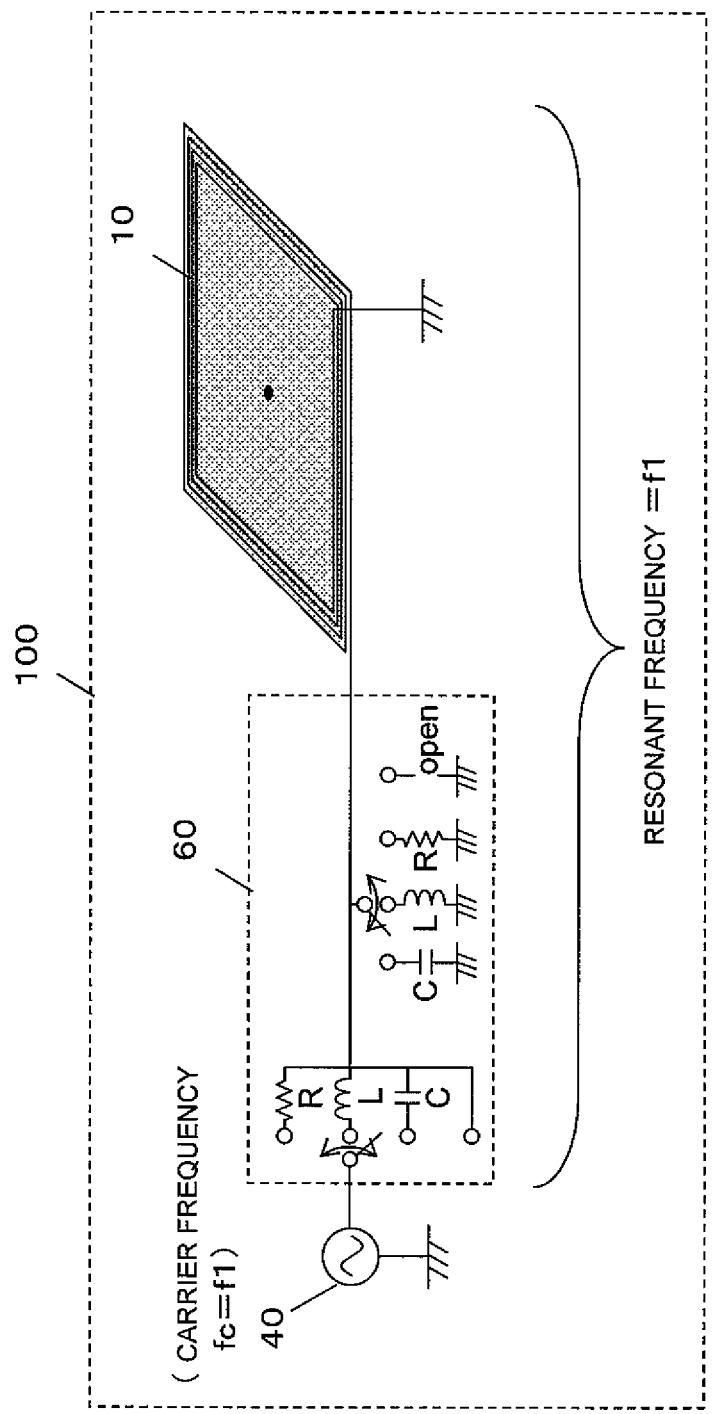
FIG. 16 illustrates an exemplary configuration for a power transmitting section including a power transmitting resonator 10 and a resonance adjustment circuit 60, which is connected to the power transmitting resonator 10, in a wireless power transmission unit according to a fourth preferred embodiment of the present invention.
Figure 17:
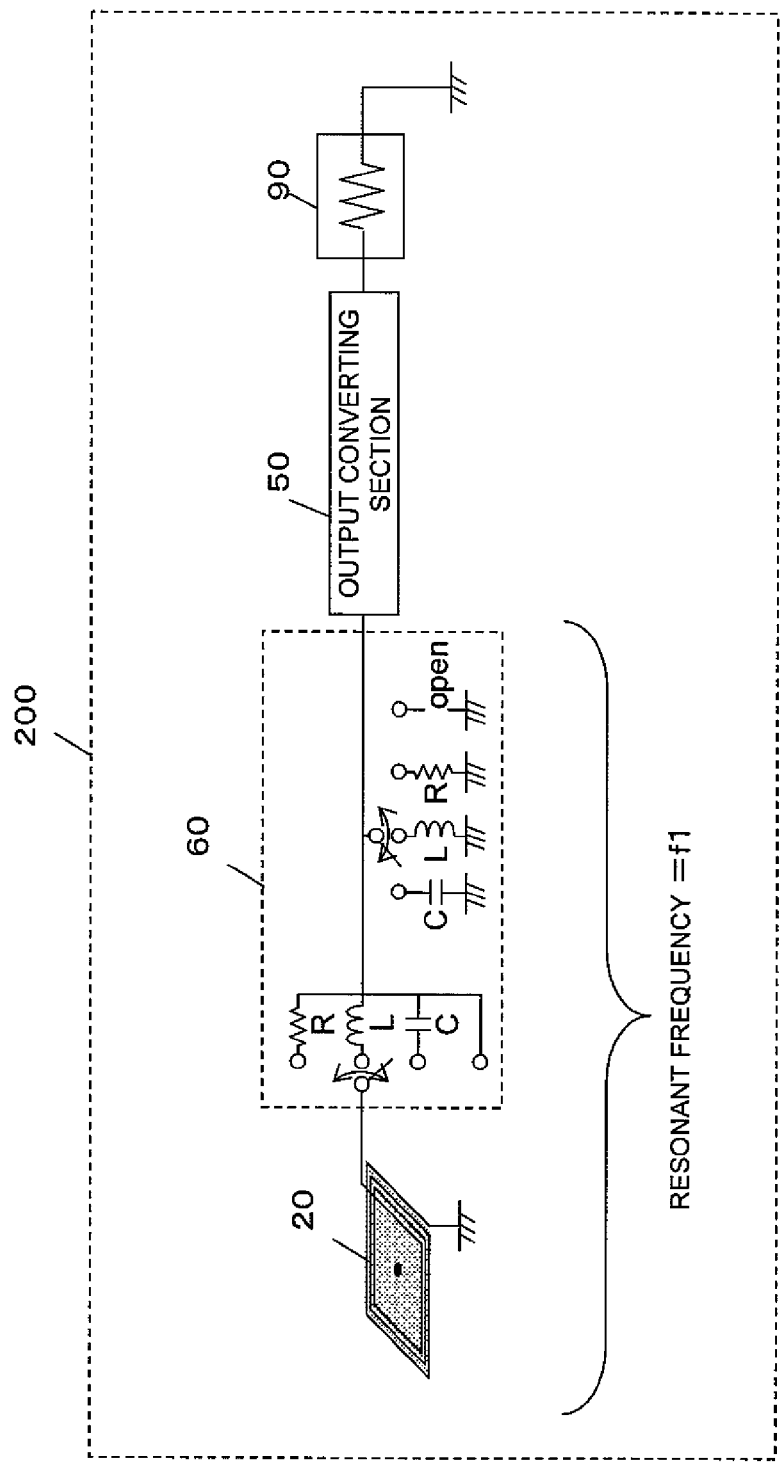
FIG. 17 illustrates an exemplary configuration for a power receiving section in which a resonance adjustment circuit 60 is connected to the power receiving resonator 20 in the wireless power transmission unit of the fourth preferred embodiment of the present invention.

FIG. 16 illustrates a configuration for a power transmitting section 100 in which the resonance adjustment circuit 60 is connected between the carrier generating section 40 and the power transmitting resonator 10. On the other hand, FIG. 17 illustrates a configuration for a power receiving resonator 200 in which the resonance adjustment circuit 60 is connected between the power receiving resonator 20 and the output converting section 50. The wireless power transmission system of this preferred embodiment has basically the same arrangement as each of the other preferred embodiments of the present invention described above except that its power transmitting section 100 and power receiving section 200 have the configurations shown in FIGS. 16 and 17, respectively.

The resonance adjustment circuits 60 shown in FIGS. 16 and 17 have the same configuration as the resonance adjustment circuit 60 that has already been described with reference to FIG. 2. With this resonance adjustment circuit 60, the resonant frequencies of the power transmitting resonator 10 and power receiving resonator 20 connected to it can be switched between f0 and f1 (≠f0).

Next, the power transmitting section 100 of this preferred embodiment will be described with reference to FIG. 16. As shown in FIG. 16, a carrier, of which the primary frequency fc is f1, is applied as a sinusoidal wave electrical signal from the carrier generating section 40 to the resonance adjustment circuit 60 that is connected to the power transmitting resonator 10. In this case, if the resonance adjustment circuit 60 sets the resonant frequency of the power transmitting resonator 10 to be f1, then electromagnetic energy with the frequency f1 can be distributed efficiently in the space surrounding the power transmitting resonator 10. Likewise, with the power receiving section 200 shown in FIG. 17, if the resonant frequency of the power receiving resonator 20 is set to be f1 using its resonance adjustment circuit 60, electromagnetic energy with the frequency f1 can be obtained efficiently.

As can be seen, by using the power transmitting section 100 shown in FIG. 16 and the power receiving section 200 shown in FIG. 17, a pair of power transmitting and receiving resonators 10 and 20 for transferring power at the resonant frequency f0 and another pair of power transmitting and receiving resonators 10 and 20 for transferring power at the resonant frequency f1 can be integrated together into a single wireless power transmission system. In addition, by switching the resonant frequency of the relay resonator 30 between f0 and f1 using the resonance adjustment circuit 60 that is connected to any relay resonator 30, that relay resonator 30 can relay the power just as required, no matter whether the resonant frequency is f0 or f1.

Embodiment 5

Hereinafter, yet another preferred embodiment of a wireless power transmission system according to the present invention will be described.

If power needs to be supplied to multiple power receiving resonators 20 that are arranged at mutually different positions, sometimes each of those power receiving resonators 20 may impose a different set of resonance conditions on the relay resonator 30 from the other(s) in order to transfer power with the best efficiency ever. The wireless power transmission system of this preferred embodiment can transmit power to those multiple power receiving resonators 20 time-sequentially.

Figure 18:
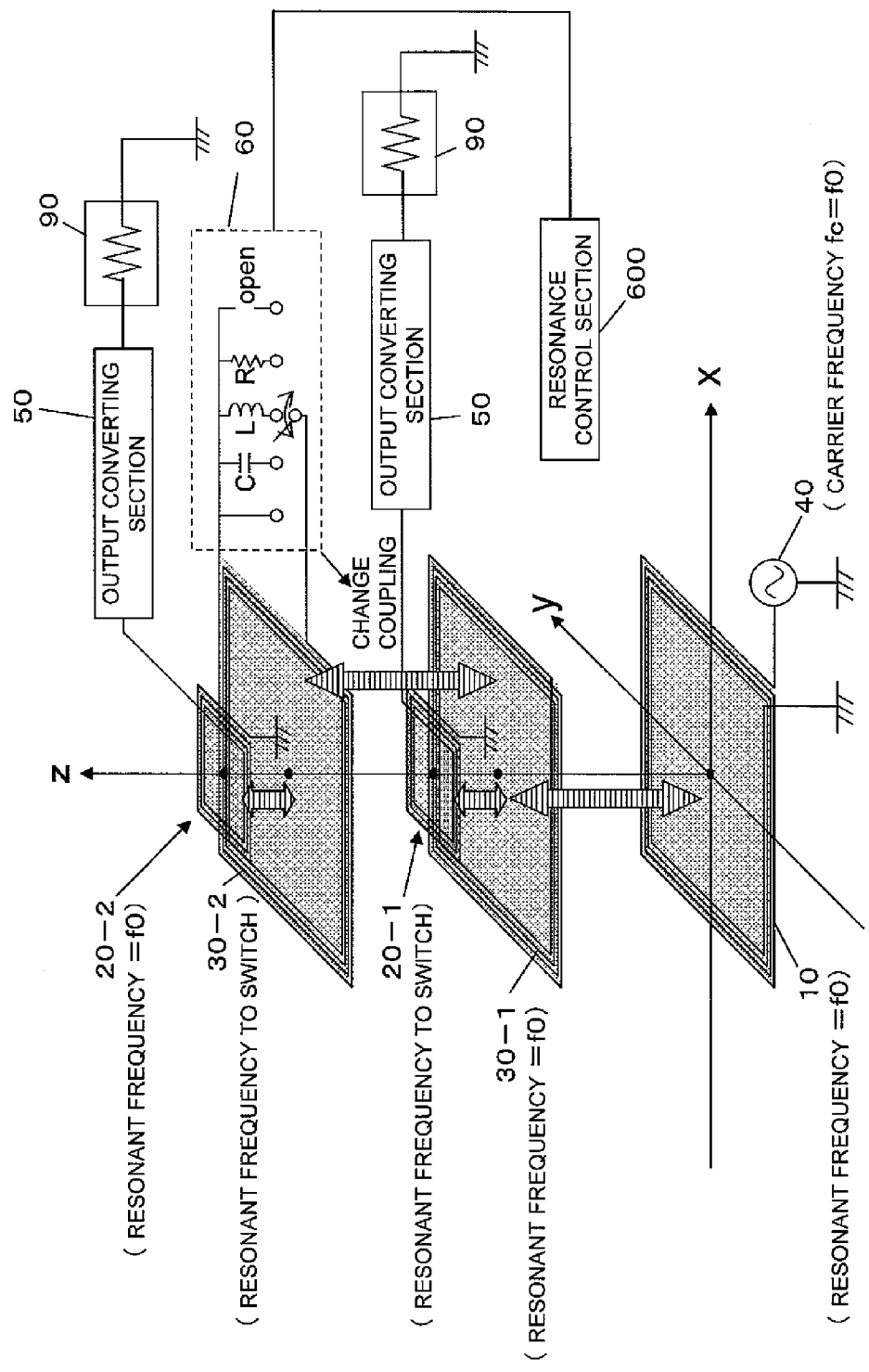
FIG. 18 illustrates an exemplary arrangement for a wireless power transmission system according to a fifth preferred embodiment of the present invention.

FIG. 18 illustrates an exemplary arrangement for a wireless power transmission system according to this preferred embodiment. The wireless power transmission system shown in FIG. 18 includes a power transmitting resonator 10 that resonates at a resonant frequency f0, first and second relay resonators 30-1 and 30-2, and first and second power receiving resonators 20-1 and 20-2. The resonator plane of the power transmitting resonator 10 is parallel to the xy plane and has its center located at the origin of the xyz coordinate system. Likewise, the respective resonator planes of the first and second relay resonators 30-1 and 30-2 are also parallel to the xy plane.

According to this preferred embodiment, the first power receiving resonator 20-1 is arranged close to the first relay resonator 30-1 and the second power receiving resonator 20-2 is arranged close to the second relay resonator 30-2 as shown in FIG. 18. In the exemplary arrangement shown in FIG. 18, the same resonance adjustment circuit 60 can be connected to not just the second relay resonator 30-2 but also the first power receiving resonator 20-1 as well. Although the resonance adjustment circuit 60 is connected to only the second relay resonator 30-2, not to the first power receiving resonator 20-1, in the state illustrated in FIG. 18, this connection state can be changed. By changing the coupling state using a switch (not shown), for example, the resonance adjustment circuit 60 can be connected to the first power receiving resonator 20-1.

As described above, when power should be supplied to the first power receiving resonator 20-1, the first and second relay resonators 30-1 and 30-2 are preferably controlled so as to be uncoupled from each other at a resonant frequency f0 by setting the resonant frequency of the second relay resonator 30-2 to be not equal to the resonant frequency f0. On the other hand, if power should be supplied to the second power receiving resonator 20-2, the second relay resonator 30-2 is preferably controlled so as to be coupled to the first relay resonator 30-1 at the resonant frequency f0. Also, in this case, the first power receiving resonator 20-1 is preferably uncoupled from the first and second relay resonators 30-1 and 30-2.

According to this preferred embodiment, power is alternately supplied to the first and second power receiving resonators 20-1 and 20-2 by appropriately changing the resonant frequencies of the first power receiving resonator 20-1 and the second relay resonator 30-2.

Figure 19:
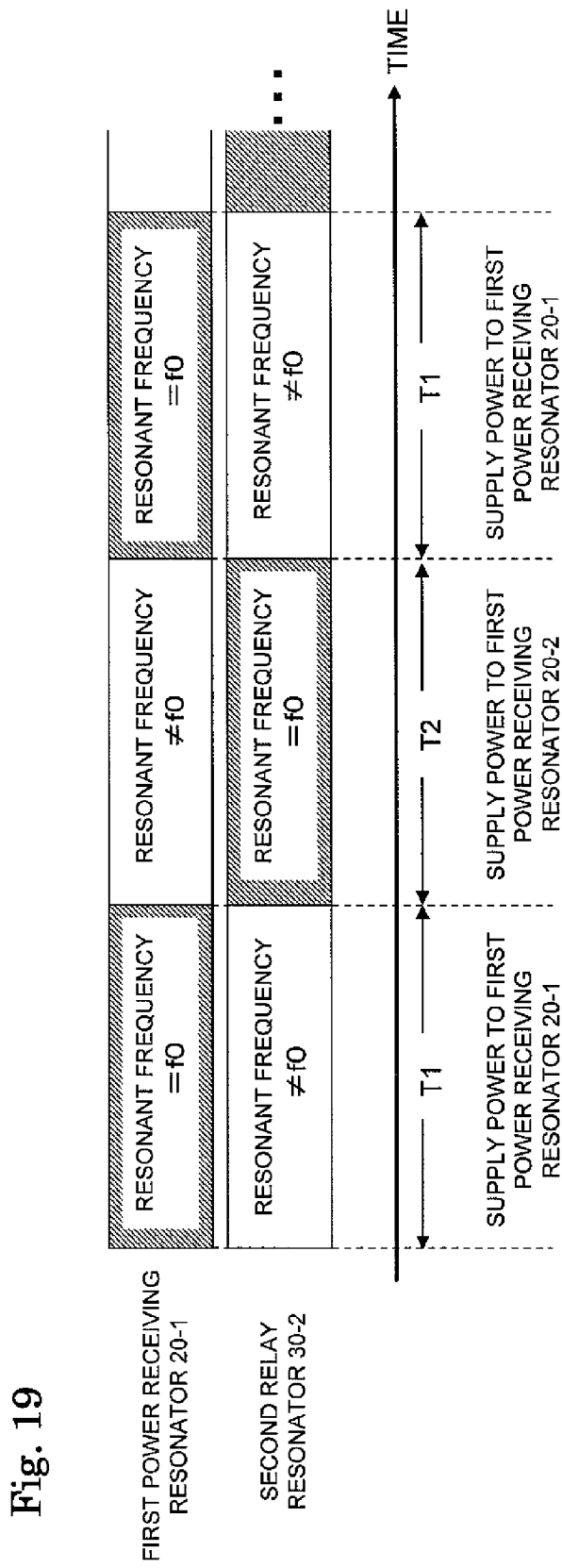
FIG. 19 illustrates how to transmit power in the fifth preferred embodiment.

FIG. 19 is a timing diagram showing how the resonance conditions imposed on the first power receiving resonator 20-1 and the second relay resonator 30-2 may be changed time-sequentially. In the example illustrated in FIG. 19, first, in period T1, the resonant frequency of the first power receiving resonator 20-1 is set to be f0 and that of the second relay resonator 30-2 is set to be a non-f0 value (falling within a non-coupling frequency range) in order to supply power to the first power receiving resonator 20-1. In this period T1, the second relay resonator 30-2 is not coupled to the first relay resonator 30-1, and therefore, substantially no power is supplied to the second power receiving resonator 20-2.

In the next period T2, the resonant frequency of the first power receiving resonator 20-1 is set to be a non-f0 value (falling within a non-coupling frequency range) and that of the second relay resonator 30-2 is set to be f0 in order to supply power to the second power receiving resonator 20-2. In this period T2, the second relay resonator 30-2 is coupled to the first relay resonator 30-1, and therefore, power is supplied to the second power receiving resonator 20-2. Also, since the first power receiving resonator 20-1 is coupled to neither the first relay resonator 30-1 nor the second relay resonator 30-2 in this period T2, no power is supplied to the first power receiving resonator 20-1.

According to this preferred embodiment, by alternately adopting two different settings for these periods T1 and T2 as shown in FIG. 19, power can be supplied to those power receiving resonators 20-1 and 20-2 on such resonance conditions that maximize the power supply efficiency. Nevertheless, since power is supplied alternately to the first and second power receiving resonators 20-1 and 20-2, each power receiving resonator is supplied with the power just intermittently. Thus, in order to supply power continuously to the respective loads that are connected to the power receiving resonators 20-1 and 20-2, a rechargeable battery may be arranged before each of those loads, for example. Such a rechargeable battery is charged while its associated power receiving resonator is being supplied with power. And if the rechargeable battery is discharged while the supply of power to the power receiving resonator is being suspended, power can be supplied to the load with good stability.

It should be noted that these periods T1 and T2 do not always have to be defined to have the same length. Optionally, the ratio of the length of the period T1 to that of the period T2 may be changed so as to be substantially proportional to the ratio of the powers required by the loads that are connected to the power receiving resonators 20-1 and 20-2. Furthermore, the number of the power receiving resonators 20 to use does not have to be two, either. For example, power may be supplied to the three power receiving resonators 20-1, 20-2, and 20-3 in periods T1, T2 and T3, respectively.

Information indicating in which period each of those power receiving resonators 20 needs to be coupled with the resonant magnetic field and receive power is included in the resonance condition information that the resonance control section 600 sends to the respective power receiving resonators 20 and relay resonators 30.

Next, it will be described what "coupling and uncoupling" between resonators means in this description.

Generally speaking, if the difference in resonant frequency between two resonators is increased, the coupling between those resonators will be weakened so much as to produce an uncoupled state. Thus, in this description, the coupling and uncoupling are defined by that difference in resonant frequency.

Figure 20:
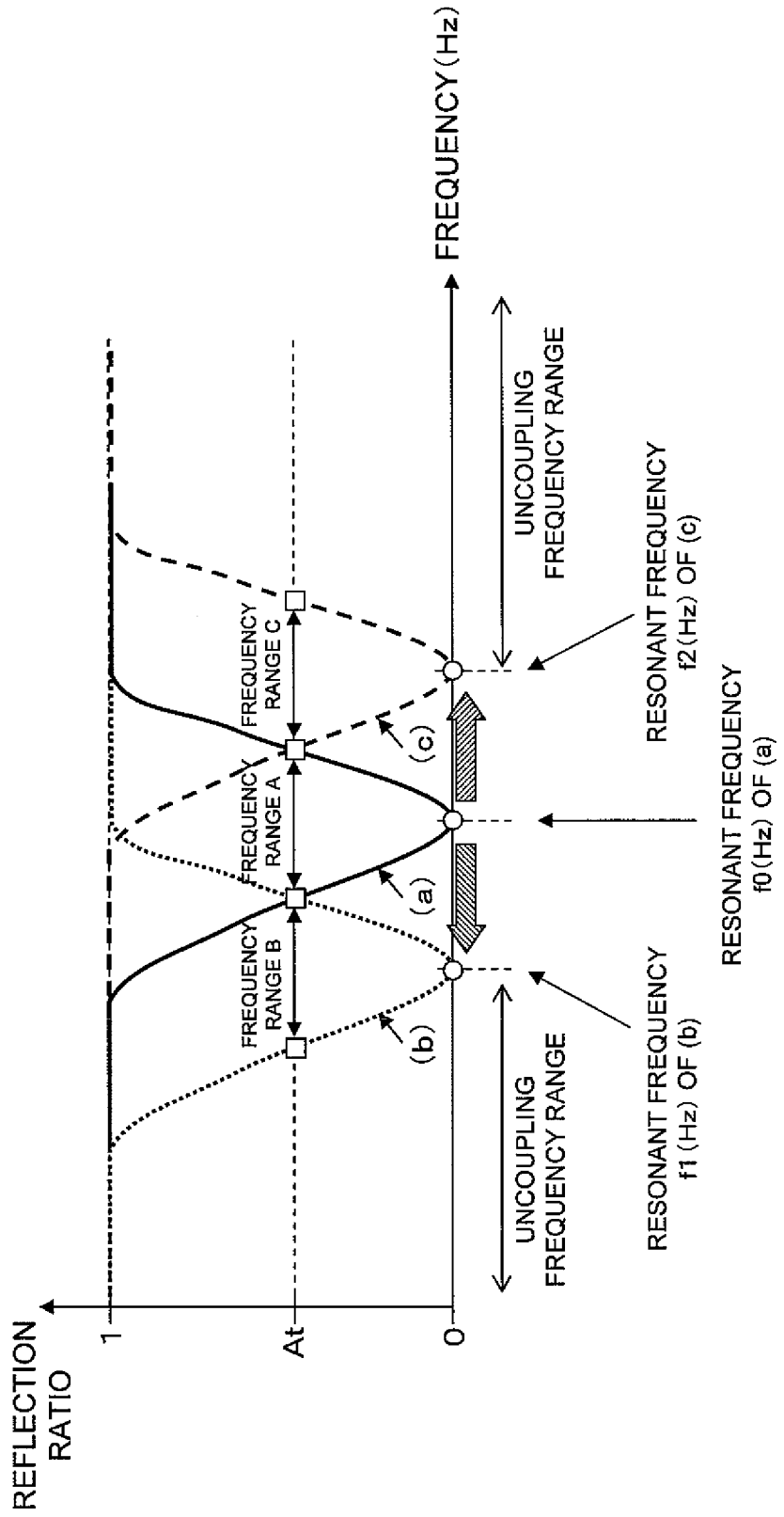
FIG. 20 illustrates uncoupling frequency ranges in a wireless power transmission system according to the present invention.

FIG. 20 is a graph schematically showing how the reflection ratio of a resonator changes with the frequency. In this description, the reflection ratio is defined herein to be the ratio of the amplitude of a signal that has been reflected from a resonator to that of an input signal that has been supplied to the resonator. Thus, the reflection ratio is a value of zero through one. That is to say, the reflection ratio corresponds to the true value of the S11 parameter of the resonator. For example, if the reflection ratio is one, it means that every input signal component is reflected without being supplied to a resonator. On the other hand, if the reflection ratio is zero, then it means that every input signal component is supplied to the resonator. In the graph shown in FIG. 20, the ordinate represents the reflection ratio that has been normalized with respect to the smallest reflection ratio of the resonator that is supposed to be zero. If the reflection ratio in the case of total reflection is one, the smallest reflection ratio that has not been normalized yet is identified by Rmin, the reflection ratio that has not been normalized yet is identified by x, and the normalized reflection ratio is identified by y, then the normalized reflection ratio is calculated by:

$$y = \frac{1}{1-R\min}x - \frac{R\min}{1-R\min} \quad (1)$$

In this case, the frequency at which the normalized reflection ratio becomes equal to zero is the resonant frequency of that resonator.

In FIG. 20, the curve (a) represents the reflection ratio characteristic of a resonator with the resonant frequency f0. A frequency range A in which the reflection ratio has a value At falling within the range of zero to one (i.e., $0 \leq At \leq 1$) is defined with respect to this curve (a). That is to say, at any frequency falling within this frequency range A, the reflection ratio becomes equal to or smaller than At. However, at a frequency outside of that frequency range A, the reflection ratio becomes greater than At.

On the other hand, the curve (b) shown in FIG. 20 indicates how the reflection ratio changes with the frequency if the resonant frequency of a resonator is set to be lower than f0. A frequency range B in which the reflection ratio becomes at most equal to At is defined with respect to this curve (b). The resonant frequency of the curve (b) when the highest frequency of the frequency range B agrees with the lowest frequency of the frequency range A is supposed to be f1. The curve (c) shown in FIG. 20 indicates how the reflection ratio changes with the frequency if the resonant frequency of a resonator is set to be higher than f0. A frequency range C in which the reflection ratio becomes at most equal to At is defined with respect to this curve (c). The resonant frequency of the curve (c) when the lowest frequency of the frequency range C agrees with the highest frequency of the frequency range A is supposed to be f2.

The frequency range in which the frequency is equal to or lower than the frequency f1 and the frequency range in which the frequency is equal to or higher than the frequency f2 are determined in this manner and defined to be "uncoupling frequency ranges" with respect to the frequency f0. Also, to "uncouple" is defined herein to set a resonant frequency within the uncoupling frequency range. It should be noted that the boundary between the coupling and uncoupling ranges changes according to the setting of the reflection ratio At. To weaken the coupling between resonators as much as possible in the uncoupling state, At is preferably set to be as large a value as possible, e.g., 0.9 or more.

Optionally, the uncoupling frequency may also be set so that the gain of the resonator becomes smaller than a predetermined value (of −20 dB, for example).

The wireless power transmission unit of the present invention can be used to charge, and supply power to, desktop and laptop computers and other kinds of office equipment, wall-mounted TV monitors, mobile AV devices and other kinds of audiovisual equipment, and hearing aids and healthcare equipment. The wireless power transmission unit can also be used to charge, and supply power to, a running or parked electric car or motorcycle and a stopped or moving robot. The unit of the present invention can find a wide variety of applications even in a system for collecting power from a solar cell or a fuel cell, a contact with a device in a DC power supplying system or a replacement for an AC outlet.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A wireless power transmission unit that transmits power wirelessly from a power transmitting section to a power receiving section through a resonant magnetic field, the unit comprising:

the power transmitting section configured to resonate at a resonant frequency f0;

a plurality of relay sections each including at least one antenna which is able to be wirelessly coupled to the resonant magnetic field generated by the power transmitting section and which is able to resonate at a frequency that is selected from multiple frequencies including the resonant frequency f0; and a resonance control section configured to output resonance condition information that specifies a resonance condition to be imposed on the relay sections according to the arrangement of the power receiving section and control the resonance condition imposed on the relay sections in accordance with the resonance condition information, wherein:

the plurality of relay sections includes a first relay section and a second relay section which is located on a same side of the power transmitting section as the first relay section and farther from the power transmitting section than the first relay section is; and when the power receiving section is coupled to the resonant magnetic field generated by the power transmitting section, when the first relay section is located closer to the power transmitting section than the power receiving section is, and when the second relay section is located farther from the power transmitting section than the power receiving section is, the resonance control section makes the first relay section resonate at the resonant frequency f0 so that the first relay section receives power transmitted by the power transmitting section and transmits the power to the receiving section, and prevents the second relay section from resonating at the resonant frequency f0.

2. The wireless power transmission unit of claim 1, comprising a telecommunications system that conveys the resonance condition information from the resonance control section to the relay section(s).

3. The wireless power transmission unit of claim 1, comprising a position detecting section that detects the position of the power receiving section and outputs the power receiving section's position information.

4. The wireless power transmission unit of claim 3, wherein the power receiving section's position information is information about the position of a power receiving resonator included in the power receiving section.

5. The wireless power transmission unit of claim 1, wherein each of the relay sections includes
a relay resonator, which resonates at the resonant frequency f0, and
a resonance adjustment circuit, which receives the resonance condition information from the resonance control section and which adjusts the resonance condition imposed on the relay resonator according to the resonance condition information.

6. The wireless power transmission unit of claim 1, wherein each of the resonance control section and the relay sections includes a telecommunications section, and
wherein the relay section receives the resonance condition information from the resonance control section by way of the telecommunications sections.

7. The wireless power transmission unit of claim 6, wherein each of the relay sections includes a position detecting section that detects the position of the power receiving section and outputs the power receiving section's position information, and
wherein the telecommunications section of each of the relay sections conveys the power receiving section's position information, which has been provided by the position detecting section, to the telecommunications section of the resonance control section.

8. The wireless power transmission unit of claim 3, wherein each of the resonance control section and the position detecting section includes a telecommunications section, and wherein the telecommunications section of the position detecting section conveys the power receiving section's position information to the telecommunications section of the resonance control section.

9. The wireless power transmission unit of claim 1, wherein the resonance control section selects one of the relay sections, which is prevented from resonating at the resonant frequency f0, by reference to the power receiving section's position information, and outputs the resonance condition information based on a result of the selection.

10. The wireless power transmission unit of claim 1, wherein
the first relay section is located between the power transmitting section and the second relay section, and when the power receiving section is located between the first and second relay sections, the resonance control section makes the first relay section resonate at the resonant frequency f0 and prevents the second relay section from resonating at the resonant frequency f0.

11. The wireless power transmission unit of claim 1, wherein the power transmitting section includes
a resonance signal generating section that generates a resonance signal with the resonant frequency f0, and
a power transmitting resonator that generates a resonant magnetic field based on the resonance signal.

12. The wireless power transmission unit of claim 11, wherein the power transmitting section further includes a resonance adjustment circuit that changes the resonant frequency of the power transmitting resonator.

13. The wireless power transmission unit of claim 1, wherein the power transmitting section and the relay sections are at least partially embedded in a wall, a floor or a ceiling of a building.

14. A device including a power receiving section to be used in combination with the wireless power transmission unit of claim 1,
wherein the power receiving section comprises
a power receiving resonator, which resonates at the resonant frequency f0, thereby receiving energy from either the power transmitting section or one of the relay sections of the wireless power transmission unit, and
an output converting section that converts the energy into electric power energy.

15. The device of claim 14, wherein the power receiving section includes
a telecommunications section, which is able to receive resonance condition information from the resonance control section, and
a resonance adjustment circuit that controls the power receiving resonator in accordance with the resonance condition information.

16. A wireless power transmission system comprising:
a power transmitting section configured to resonate at a resonant frequency f0;
a plurality of relay sections each including at least one antenna which is able to be wirelessly coupled to the resonant magnetic field generated by the power transmitting section and which is able to resonate at a frequency that is selected from multiple frequencies including the resonant frequency f0;
at least one power receiving section, configured to resonate at the resonant frequency f0; and
a resonance control section configured to output resonance condition information that specifies a resonance condition to be imposed on the relay section according to the arrangement of the power receiving section and control the resonance condition imposed on the relay section in accordance with the resonance condition information, wherein:

the plurality of relay sections includes a first relay section and a second relay section which is located on a same side of the power transmitting section as the first relay section and farther from the power transmitting section than the first relay section is; and when the power receiving section is coupled to the resonant magnetic field generated by the power transmitting section, when the first relay section is located closer to the power transmitting section than the power receiving section is, and when the second relay section is located farther from the power transmitting section than the power receiving section is, the resonance control section makes the first relay section resonate at the resonant frequency f0 so that the first relay section receives power transmitted by the power transmitting section and transmits the power to the receiving section, and prevents the second relay section from resonating at the resonant frequency f0.

17. The wireless power transmission system of claim 16, wherein the at least one power receiving section includes multiple power receiving sections, which are able to resonate at frequencies that are selected from multiple frequencies including the resonant frequency f0, and wherein the resonance control section outputs resonance condition information that specifies resonance conditions to be imposed on the relay section and the multiple power receiving sections according to the arrangement of the power receiving sections, controls the resonance conditions imposed on the relay section and the power receiving sections in accordance with the resonance condition information, and supplies power to the power receiving sections time-sequentially.

18. The wireless power transmission system of claim 16, wherein the power transmitting section includes multiple power transmitting resonators, which are arranged so as to cross each other at right angles.

19. The wireless power transmission system of claim 18, comprising a direction detecting section that detects the direction of a power receiving resonator that is included in each said power receiving section and outputting direction information based on a result of the detection, wherein the power transmitting section makes one of the multiple power transmitting resonators, which has been selected based on the direction information, resonate at the resonant frequency f0.

* * * * *